US011149800B1

(12) United States Patent  
Logan et al.

(10) Patent No.: US 11,149,800 B1  
(45) Date of Patent: Oct. 19, 2021

(54) CLUTCH LUBRICATION SYSTEM

(71) Applicant: Logan Clutch Corporation, Westlake, OH (US)

(72) Inventors: W. Andrew Logan, Lakewood, OH (US); Scott W. Stevens, Columbia Station, OH (US)

(73) Assignee: LOGAN CLUTCH CORPORATION, Westlake, OH (US)

( * ) Notice: Subject to any disclaimer, the term of this patent is extended or adjusted under 35 U.S.C. 154(b) by 34 days.

(21) Appl. No.: 16/590,802

(22) Filed: Oct. 2, 2019

Related U.S. Application Data

(60) Provisional application No. 62/746,065, filed on Oct. 16, 2018.

(51) Int. Cl.
| | |
|---|---|
| *F16D 13/74* | (2006.01) |
| *F16D 13/52* | (2006.01) |
| *F16D 13/64* | (2006.01) |
| *F16D 25/12* | (2006.01) |
| *F16D 25/0638* | (2006.01) |

(52) U.S. Cl.
CPC .............. *F16D 13/74* (2013.01); *F16D 13/52* (2013.01); *F16D 13/648* (2013.01); *F16D 25/0638* (2013.01); *F16D 25/123* (2013.01)

(58) Field of Classification Search
CPC ........ F16D 13/52; F16D 13/648; F16D 13/74; F16D 25/0638; F16D 25/123
See application file for complete search history.

(56) References Cited

U.S. PATENT DOCUMENTS

| | | | | |
|---|---|---|---|---|
| 2,136,811 A | * | 11/1938 | Burtnett | F16D 21/06 192/48.7 |
| 2003/0183474 A1 | * | 10/2003 | Heidenreich | F16D 25/0638 192/70.2 |
| 2011/0114436 A1 | * | 5/2011 | Noehl | F16D 25/123 192/48.601 |
| 2018/0252272 A1 | * | 9/2018 | Boland | B60K 17/28 |

* cited by examiner

*Primary Examiner* — David R Morris  
*Assistant Examiner* — Lori Wu  
(74) *Attorney, Agent, or Firm* — Ralph E. Jocke; Walker & Jocke

(57) ABSTRACT

A fluid actuated clutch (40) includes a disc pack (120) that includes friction discs (122) and separator discs (124) mounted on a hub (50). A cylinder (68) which includes a movable piston (72) is in connection with the hub. The introduction and release of fluid to a variable volume chamber (76) selectively applies force to the disc pack to engage the clutch and releases the force to disengage the clutch. The clutch includes internal bearings (90, 82). Grease or other lubricant material is injected into a radially extending lubricant passage (96). The lubricant is held in the area of the bearings and other moving parts by rigid annular grease shields (93, 79). Annular grease release gaps (61, 107) prevent over packing with lubricant while maintaining lubrication and facilitating cooling.

24 Claims, 14 Drawing Sheets

CLUTCH LUBRICATION SYSTEM

TECHNICAL FIELD

Exemplary embodiments relate to power transmission devices. Exemplary embodiments specifically relate to clutches with an improved lubrication system.

BACKGROUND

Fluid actuated clutches, such as those that are actuated by the delivery and release of compressed air or liquid, generally require lubrication to have an extended service life. Lubricants such as greases or other lubricants of various compositions are delivered to the bearings and other moving parts within the clutches in order to reduce friction and wear.

Many types of clutches are subject to high loads and service conditions which result in high clutch operating temperatures. Such high temperatures can cause failures of resilient contact seals which may be used to maintain the lubricant in the areas of the clutch bearings and other moving parts. High temperatures can also reduce the viscosity of greases and other lubricants, and centrifugal forces produced by rotation of clutch components at high speeds may result in seal leakage and loss of lubricant. This may result in premature wear and failure of clutch components.

In some situations too much lubricant may be packed into a sealed area within the clutch. Excess lubricant can sometimes prevent the escape of heat from the sealed area. This can also result in chemical breakdown of the lubricant and loss of lubricating properties. The failure of lubricants due to excess heat may also produce wear and premature failures.

Lubrication approaches and systems used in connection with fluid actuated clutches may benefit from improvements.

SUMMARY

Exemplary embodiments include a lubrication arrangement used in connection with a fluid actuated clutch. The exemplary lubrication arrangement avoids the use of resilient contact seals for purposes of sealing areas within clutch structures in which clutch bearings are located. The exemplary lubrication arrangement is operative to retain lubricant in contact with the bearings and other components during operating conditions. The exemplary arrangement further avoids the risk of damage to resilient seals as a result of high temperature and pressure operating conditions. Exemplary arrangements further reduce the risk of damage due to over lubrication and help to provide heat dissipation. Other advantageous aspects of exemplary embodiments will be made apparent in the following Detailed Description.

DETAILED DESCRIPTION

Figure 1:
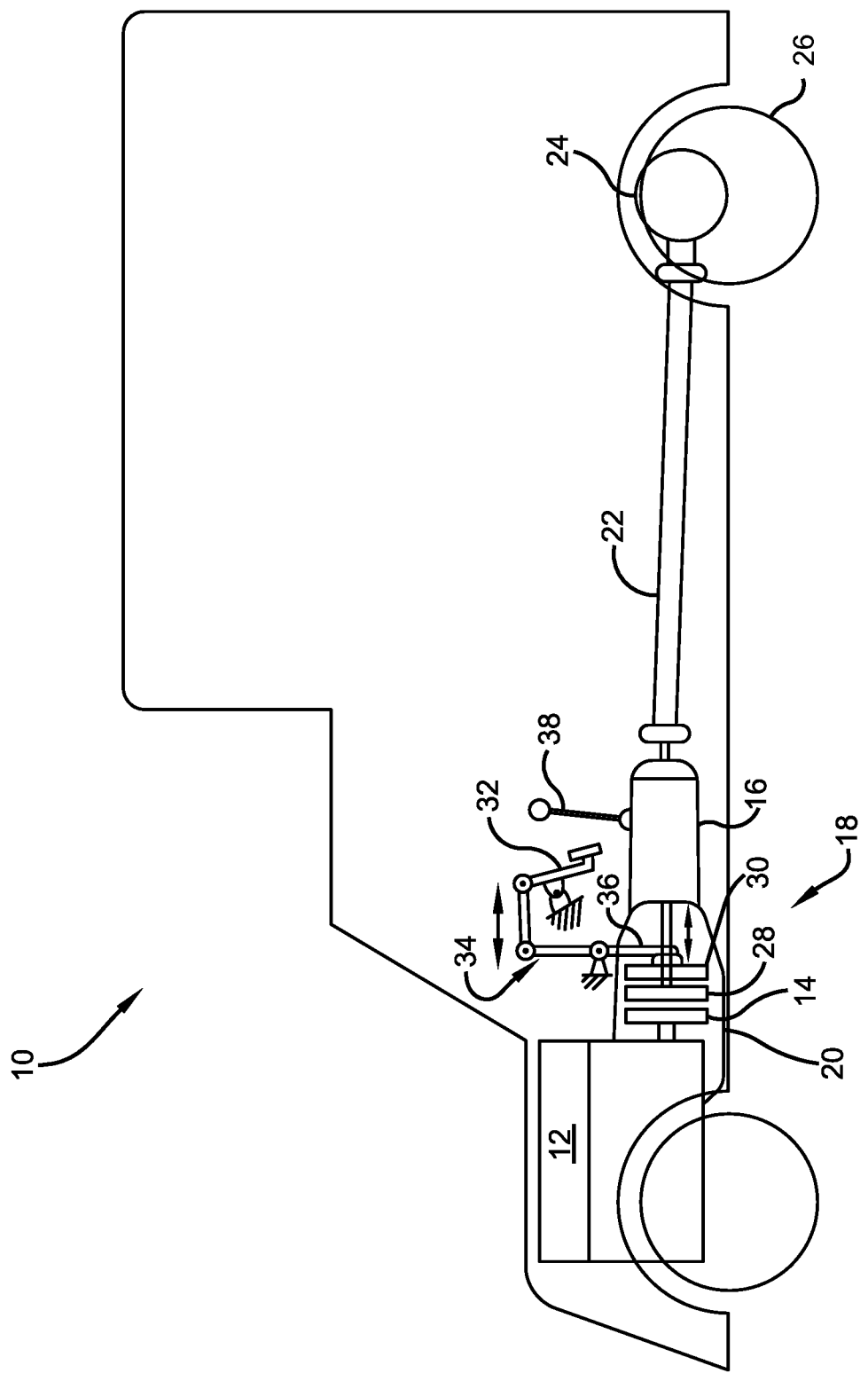
FIG. 1 is a schematic view of a truck or other heavy vehicle with a manual transmission and that includes a lever actuated dry clutch.

Referring now to the drawings and particularly to FIG. 1, there is shown therein schematically a truck 10. The exemplary truck is a vehicle designed for carrying relatively heavy loads over public highways. However as used herein the term truck shall also apply to vehicles such as buses, semi tractors, box trucks, panel trucks, dump trucks, construction vehicles and other vehicles that are made to carry more significant loads than standard personal passenger vehicles. It should be understood that use in connection with trucks is only an example of devices in which exemplary embodiments of the clutch and lubrication system described herein may be used. Clutches including principles of the exemplary arrangements may be utilized in a wide range of mechanical power transmission applications.

The exemplary truck 10 includes an engine 12. The engine 12 has an attached flywheel 14 which in the exemplary embodiment is in attached connection with the crankshaft of the engine. A manual transmission 16 is operatively connected to the flywheel through a lever actuated dry clutch 18. A bell housing 20 extends between the engine 12 and the transmission 16. The bell housing 20 houses the clutch 18. The transmission 16 is connected to a driveshaft 22. The driveshaft is connected to a differential 24 which includes axle shafts that operate to drive the rear wheels 26 of the truck.

The exemplary dry clutch includes at least one clutch disc 28 and a pressure plate 30. The exemplary pressure plate includes a diaphragm spring. The diaphragm spring is connected to the pressure plate so that deformation of the diaphragm spring in a direction toward the clutch disc causes the pressure plate to move in an opposite direction which disengages the pressure plate from the clutch disc. With the clutch disengaged, the rotational movement of the flywheel 14 and the engine 12 is not transmitted by the clutch to the transmission 16. When the diaphragm spring is in its normal undeformed condition, the pressure plate is in biased engagement with the clutch discs and rotation of the flywheel is transmitted through the clutch to the transmission 16.

In an exemplary arrangement the condition of the clutch is controlled by the operator of the truck through movement of a clutch pedal 32. As represented schematically, the clutch pedal 32 is connected through a linkage 34 to a lever 36 that extends inside the bell housing 20. When the operator (which is also referred to herein as the driver) pushes down on the clutch pedal 32, the linkage 34 causes the lever 36 to move an annular bearing that is engaged with the diaphragm spring. The annular bearing moves the diaphragm spring toward the clutch plate 28, thus disengaging the clutch. This enables the operator to change gears of the transmission 16 through use of a shift lever 38. Releasing the clutch pedal 32 and allowing it to move upwards, causes the linkage 34 to move the lever 36 to allow the diaphragm spring to return to its undeformed position. This causes the pressure plate 32 to engage the clutch plate 28 and causes the rotational movement of the flywheel 14 to be transmitted through the transmission 16 to the driving wheels 26. This basic arrangement enables the operator of the truck to initiate movement, discontinue movement and to change the driving speed that is imparted to the driving wheels by the engine by changing gears. Further the exemplary transmission arrangement also includes a reverse gear that enables the operator to selectively move the truck in a reverse direction. Of course it should be understood that this arrangement is merely exemplary of truck clutch and transmission arrangements which is only one clutch application that may be improved through use of the exemplary arrangements described herein.

Figure 2:
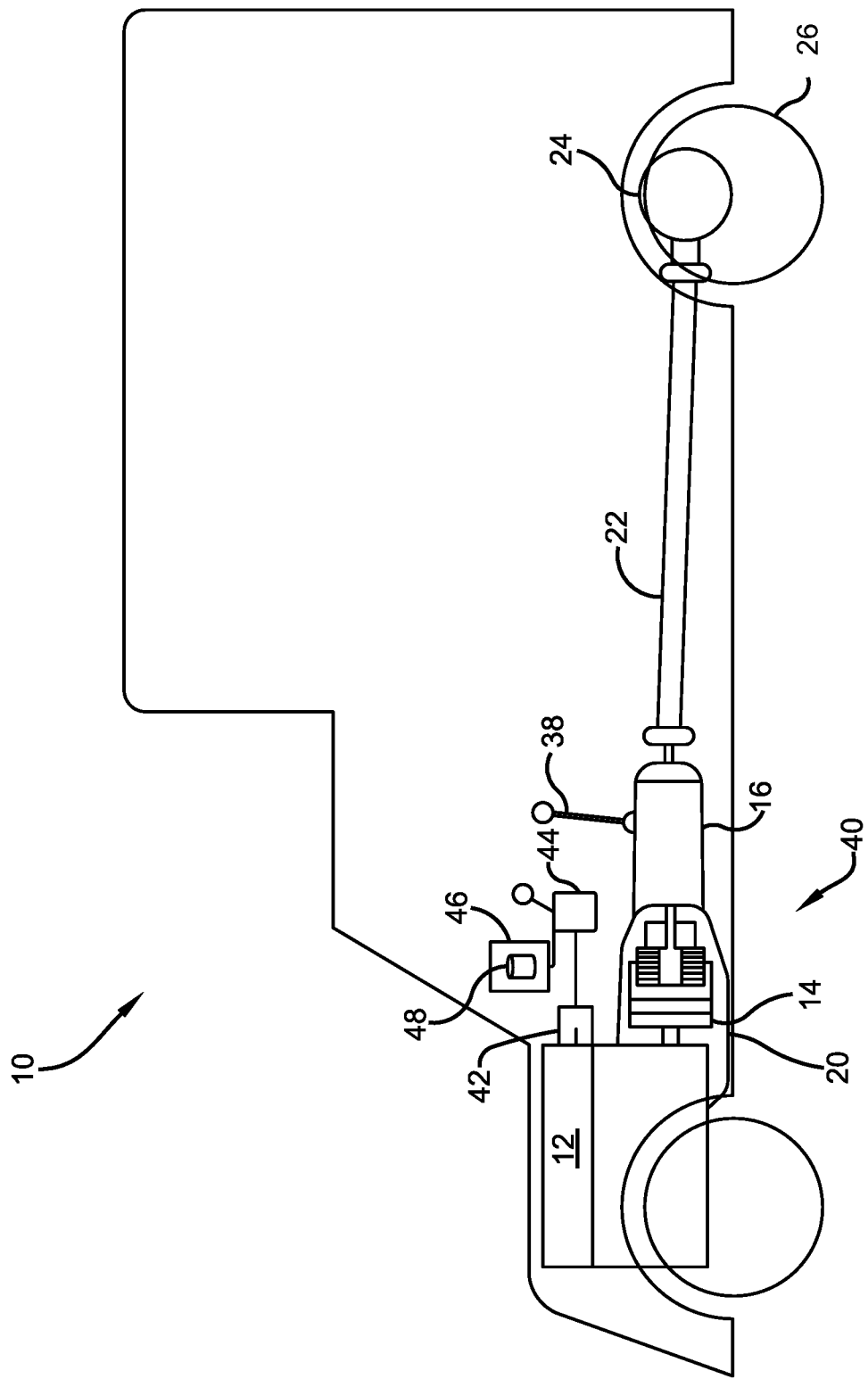
FIG. 2 is a similar schematic view of a truck or other heavy vehicle which has an exemplary fluid actuated clutch conversion kit installed.
Figure 3:
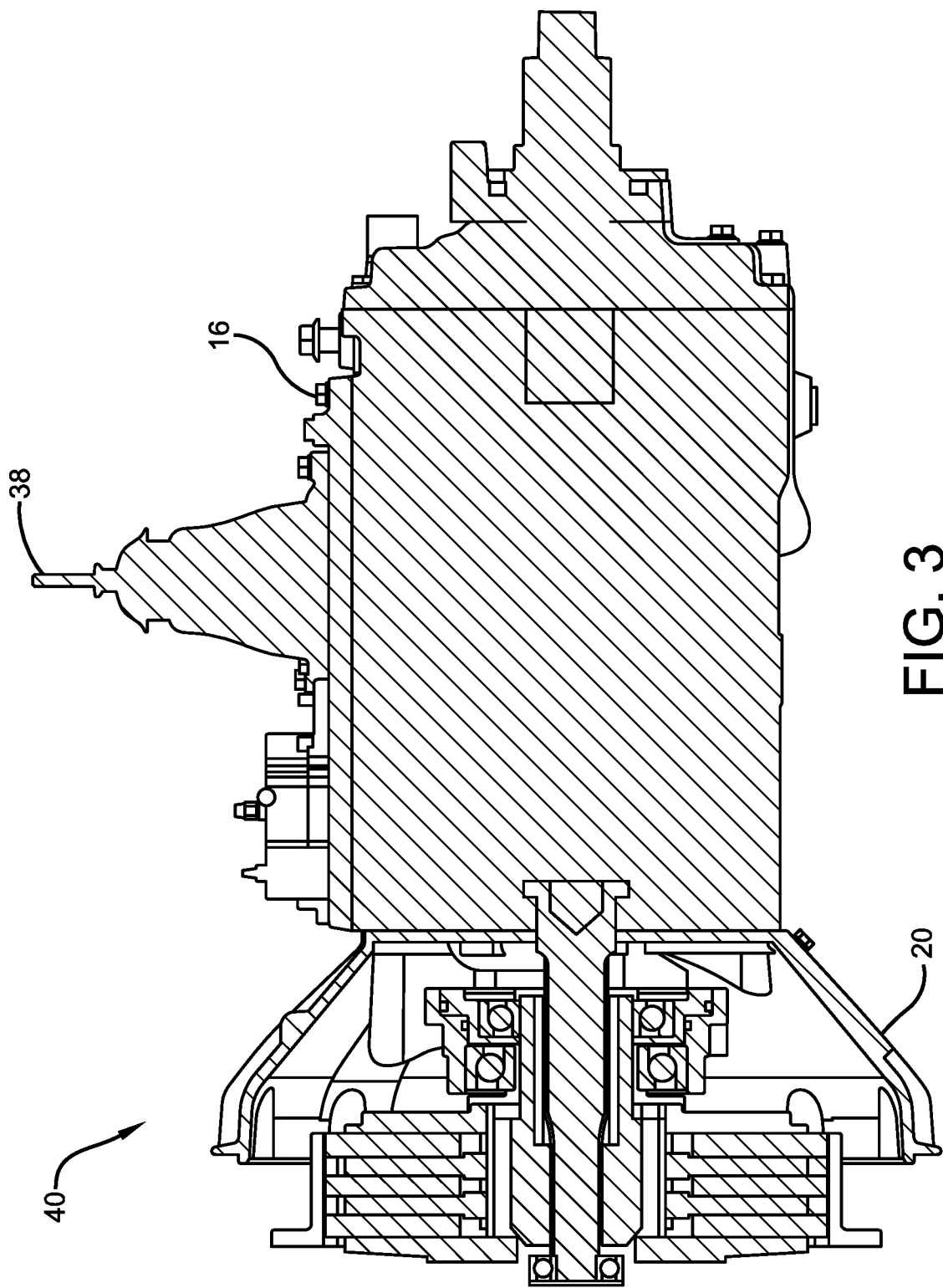
FIG. 3 is a cross-sectional schematic view of the fluid actuated clutch and an exemplary manual transmission.

FIG. 2 shows schematically truck 10 as modified through use of the conversion kit of an exemplary arrangement described herein. The exemplary conversion kit enables removing the lever actuated dry clutch 18 and replacing it with a fluid actuated clutch 40. The exemplary fluid actuated clutch and associated conversion kit components described hereafter, enable selectively operatively connecting the engine flywheel 14 and the transmission 16 through the application and release of fluid pressure to the clutch. The exemplary clutch 40 is at least partially housed in the bell housing 20 and operatively connects to the flywheel 14 and the transmission 16 without a need for modifications to those components.

In the exemplary arrangement shown schematically in FIG. 2, a source of fluid pressure such as a hydraulic pump or an air compressor pump 42 supplies fluid pressure to a proportional control valve 44. The exemplary control valve is operated to apply and release fluid pressure from the pump 42 to the clutch 40. Exemplary embodiments may provide for control of the control valve 44 through a manual lever, a foot actuated lever, a button, a switch, a trigger or other control device, or a combination thereof. This enables the operator of the truck to control the clutch in the manner necessary to commence movement, discontinue movement and to shift gears as previously discussed.

Further in some exemplary arrangements, the control valve 44 may be in operative connection with a controller 46. In exemplary arrangements the controller includes circuitry that executes programmable instructions to control at least some aspects of the pressure applied to the clutch. For example circuit executable instructions stored in one or more data stores 48 associated with the controller 46 may be operative to cause the controller to receive signals from sensors that indicate the current speed of the vehicle, the engine speed, torque loading and other parameters. Responsive to the sensed data and the programmed instructions, the controller may operate to control the rate at which pressure is delivered to the clutch so as to provide smooth engagement of the clutch and avoid undesirable conditions such as stalling or jerking. Alternatively or in addition, the controller 46 may operate in accordance with its programming to prevent the clutch from being engaged or disengaged under certain circumstances. For example the programming associated with the controller circuitry may prevent the clutch from engaging when sensors indicate to the controller that the truck is moving at a relatively high speed in a forward direction, and the transmission has been placed in reverse. These and numerous other conditions may be controlled through operation of the controller in exemplary embodiments, thus facilitating the operation of the truck and avoiding undesirable conditions that might otherwise occur.

Figure 4:
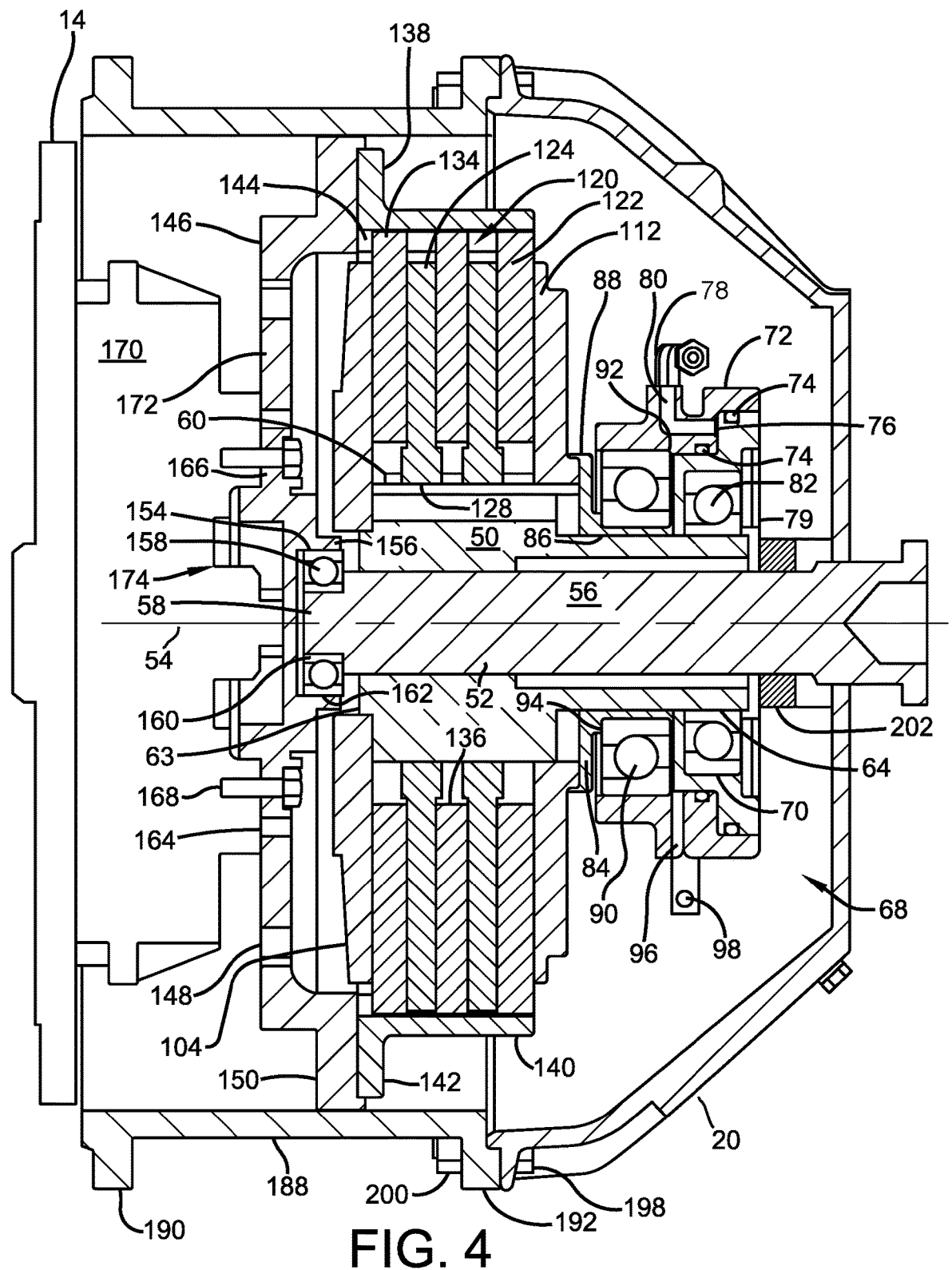
FIG. 4 is a cross-sectional view of an exemplary fluid actuated clutch conversion kit in operative connection with an engine flywheel through a flexible drive coupling.
Figure 5:
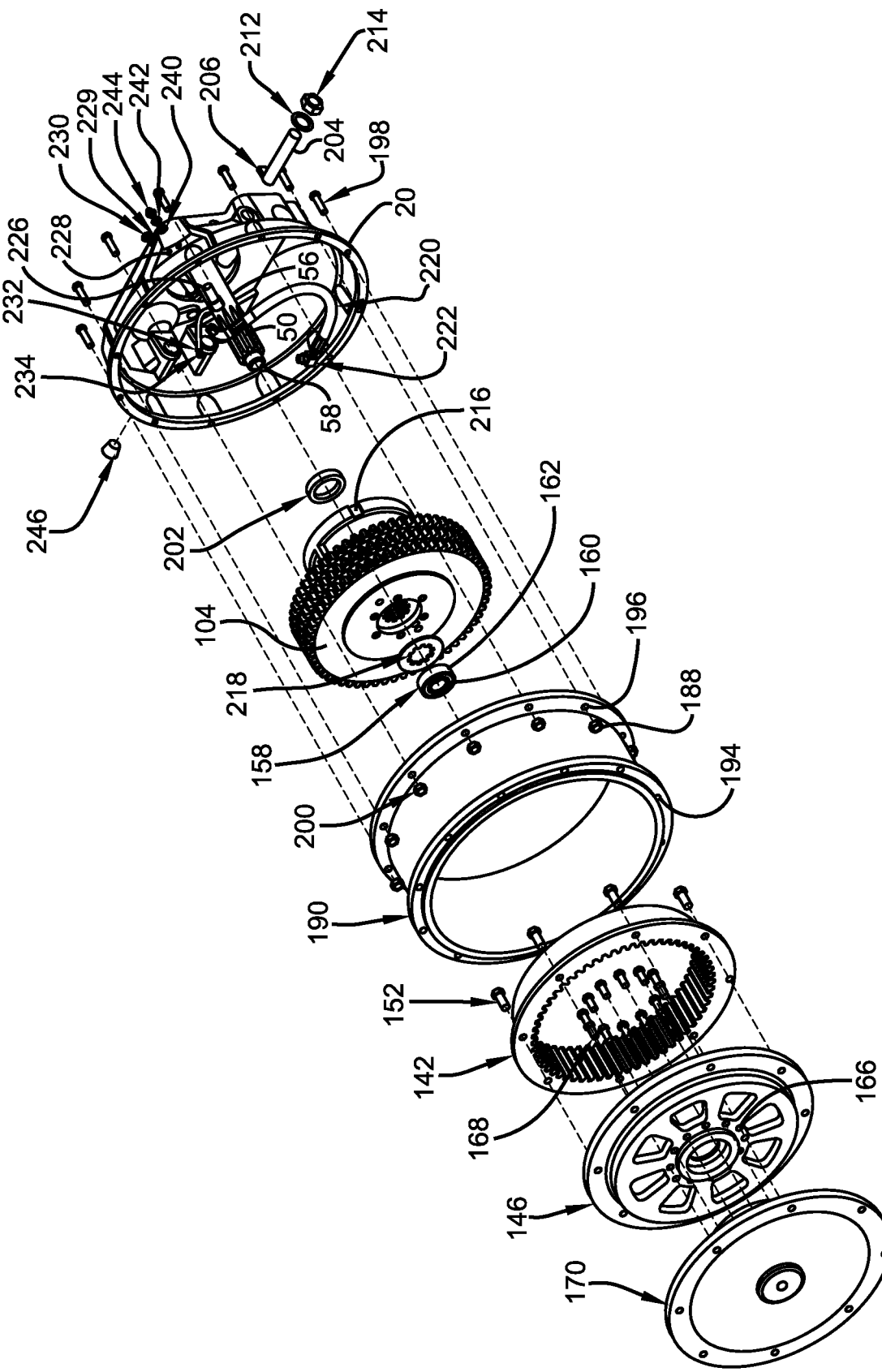
FIG. 5 is a perspective exploded view of a bell housing, a flexible drive coupling and the constituents of the exemplary clutch conversion kit.

As shown in FIGS. 4 and 5, in an exemplary arrangement the truck is converted from using the lever actuated dry clutch to the fluid actuated clutch 40 through use of a conversion kit generally indicated 49 comprising a plurality of components. In the exemplary arrangement the components included in the kit 49 include a generally cylindrical hub 50. The hub includes a hub opening 52 that is axially elongated and extends through the hub along a central axis 54. The hub opening is configured to receive an input shaft 56 of the transmission 16 therein. In the exemplary arrangement an inboard end of the input shaft 56 is splined as is a corresponding length of the hub opening 52. This enables the input shaft 56 and the hub 50 to be engaged in rotatable connection. In other exemplary embodiments keys or other structures may be used for holding the hub in rotatably engaged relation with a shaft. As best shown in FIG. 5 the exemplary input shaft 56 includes an inboard cylindrical extension 58 at its inboard end. It should be understood that for purposes of this disclosure the term inboard will refer to closer along axis 54 to the flywheel 14 or other driving device when installed in the operative position, and likewise the term outboard will refer to closer along axis 54 to the transmission 16 or other driven device when in the operative position.

Figure 13:
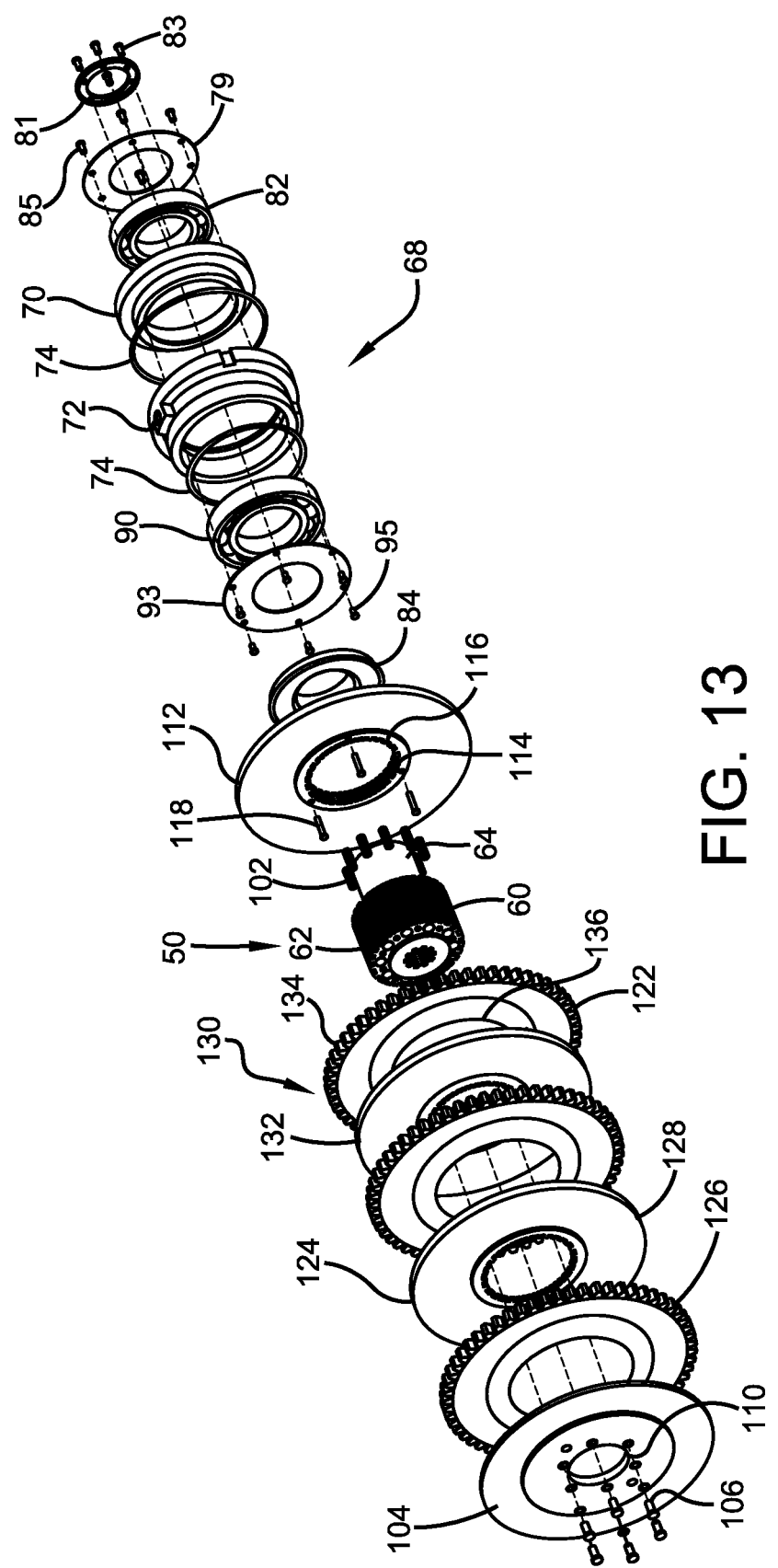
FIG. 13 is an exploded perspective view of the hub, cylinder, backplate, pressure plate and disc pack of the exemplary conversion kit.

The exemplary hub 50 includes an annular external hub splined portion 60. As also shown in FIG. 13, the hub splined portion 60 includes a plurality of angularly spaced outward directed axially elongated splines 62. The hub splined portion 60 extends adjacent to an inboard end 63 of the hub 50. The exemplary hub 50 further includes a cylindrical portion 64. The cylindrical portion comprises an outer hub portion of the exemplary hub, extends adjacent to the outboard end 66 of the hub and is of a constant diameter. Of course it should be understood that this configuration is exemplary and in other embodiments other arrangements may be used.

Figure 15:
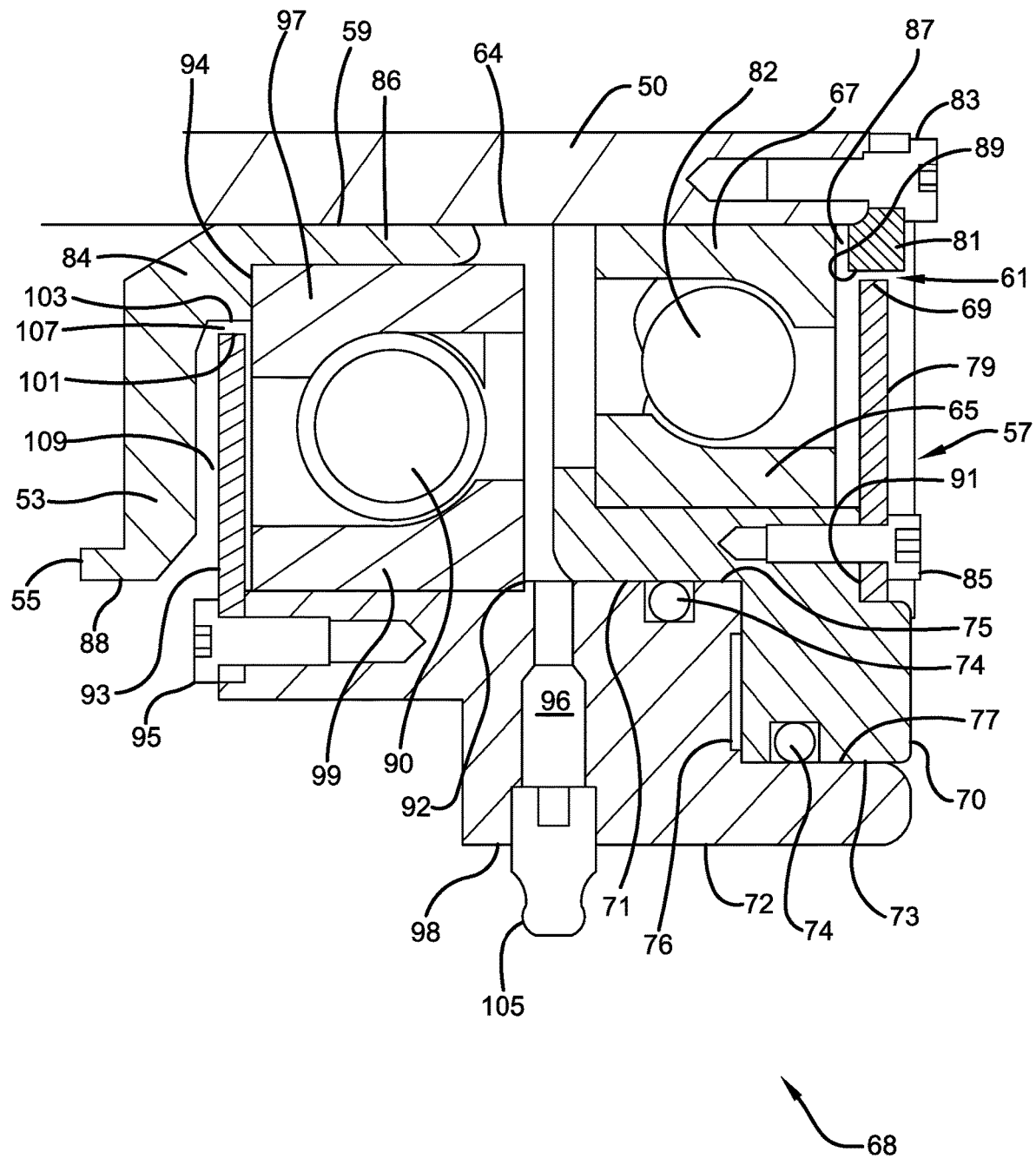
FIG. 15 is an enlarged cross-sectional view of the lubrication seal arrangement of an exemplary embodiment.

The exemplary conversion kit 49 further includes a fluid actuated cylinder 68. Cylinder 68 is an annular cylinder that extends in surrounding relation of the cylindrical portion 64 of the hub. The exemplary cylinder 68 includes a housing 70 and a piston 72. The piston 72 is an annular piston that is movably mounted on the housing 70. Resilient annular seals 74 extend between the housing 70 and the piston 72. The pair of resilient annular seals 74 bound a variable volume annular fluid chamber which is alternatively referred to as a cavity 76, in fluid tight relation. The annular chamber extends axially. As best shown in FIG. 15, the housing 70 includes annular housing outer wall surfaces 71 and 73 each of which extend parallel to axis 54. Annular housing outer wall surface 73 is radially disposed further outward from axis 54 than housing outer wall surface 71. Piston 72 includes annular inner wall surfaces 75 and 77 each of which extend parallel to the axis. Piston inner wall surface 75 extends adjacent to and in close proximity to housing outer wall surface 71 of the housing 70. An annular resilient seal 74 extends radially intermediate of housing outer wall surface 71 and piston inner wall surface 75. Piston inner wall surface 77 extends adjacent to and in close proximity to housing outer wall surface 73. An annular resilient seal 74 extends radially intermediate of the piston inner wall surface 77 and the housing outer wall surface 73. The resilient seals 74 enable relative axial movement of the piston and housing while maintaining the variable volume chamber 76 in a substantially sealed condition. As later discussed, the piston 72 axially moves relative to the housing 70 of the cylinder 68 responsive to the amount of fluid such as hydraulic fluid or pressurized air, that is present in the cavity 76 that varies the volume of the cavity. In the exemplary arrangement a pressure fitting opening 78 is in connection with a fluid passage 80 that extends to the cavity 76. The pressure fitting opening supplies fluid to and releases fluid from cavity 76 to selectively vary the volume of the cavity and cause axial movement of the piston relative to the housing.

Figure 14:
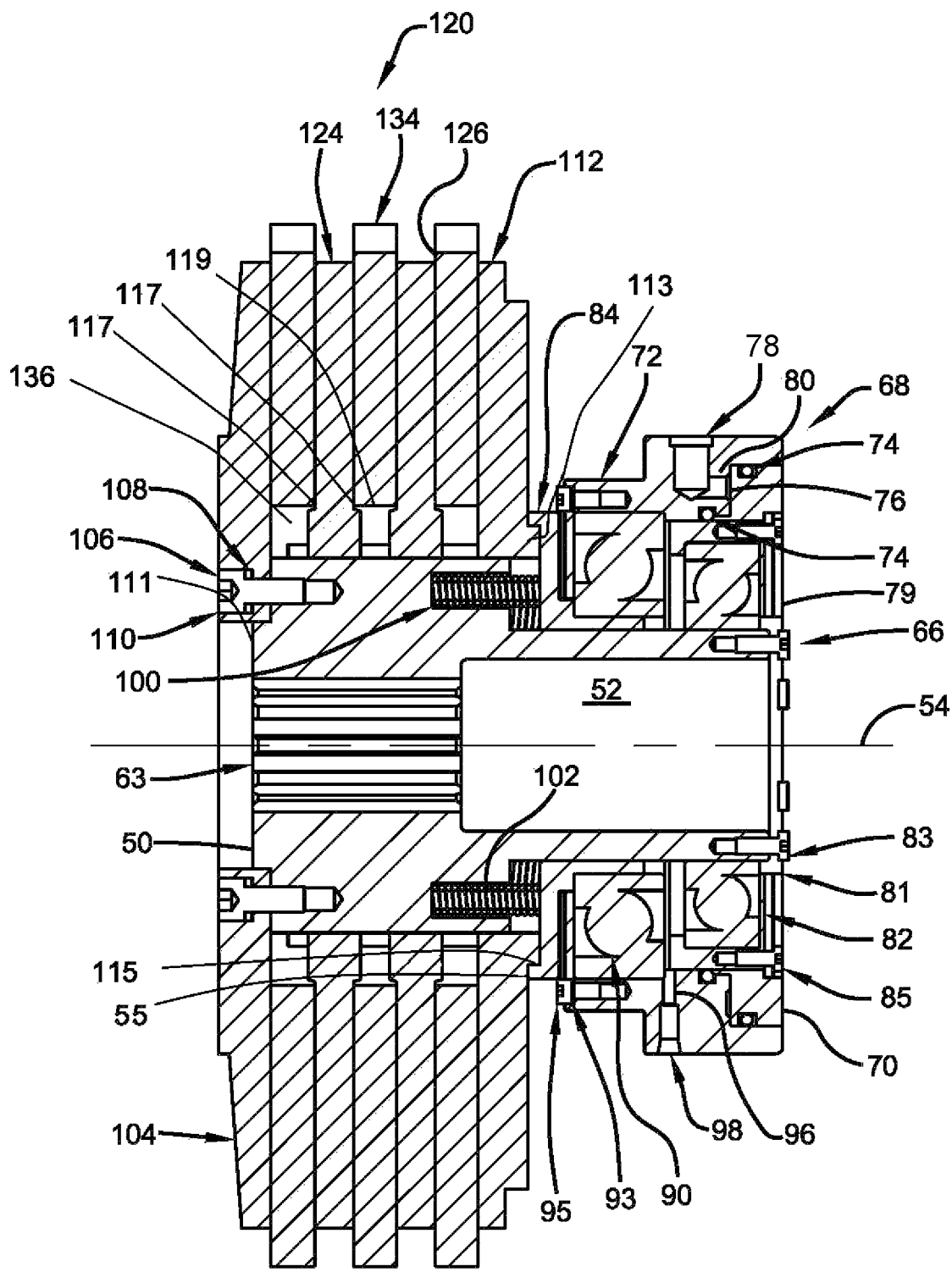
FIG. 14 is a cross-sectional view of the assembled, components of the conversion kit shown in FIG. 13.

In the exemplary arrangement the kit 49 further includes an outboard bearing 82. The outboard bearing 82 is configured to be positioned radially intermediate of the cylindrical portion 64 of the hub 50 and the housing 70 of the cylinder 68. The outboard bearing 82 has an outer race 65 and an inner race 67 that are rotationally movable independently and which enables the hub to rotationally move independent of the cylinder. As best shown in FIGS. 14 and 15, the outboard bearing 82 is held in position within the housing 70 of the cylinder 68 by an annular retainer 81. Retainer 81 includes a radially outward extending retainer step 87 that is in abutting engagement with inner race 67 of bearing 82. The retainer 81 is held in place by a plurality of angularly spaced fasteners 83. Retainer 81 is bounded radially outwardly by an annular outer hub ring surface 89, which ring surface bounds a circular outboard grease shield opening. In the exemplary arrangement an annular grease shield 79 overlies the outboard bearing 82 on the outboard side. The grease shield 79 is comprised of rigid material such as metal. The grease shield 79 is held in position in abutting relation against an annular radially outward extending housing step 91 that bounds an axial housing recess 57 in housing 70, by a plurality of angularly spaced fasteners 85. The housing recess 57 extends in the inboard direction from the outboard face of the housing. Grease shield 79 terminates radially inwardly at an annular outboard grease shield opening surface 69. The outer hub ring surface 89 of the retainer 81 and the annular outboard grease shield opening surface 69 are in close fitting facing relation and bound a radially extending outboard grease release gap 61. In the exemplary arrangement the outboard grease release gap 61 is of fixed size to consistently maintain a small radially extending annular gap between the retainer 81 and the outboard grease shield 79, and to avoid metal to metal contact despite radial play in the bearings and despite thermal expansion when the clutch is at high operating temperatures. Of course this arrangement is exemplary and in other embodiments other approaches may be used.

The exemplary kit 49 further includes an annular pressure sleeve 84 which is alternatively referred to herein as a push ring. The exemplary pressure sleeve includes an annular inner pressure sleeve portion 86. The annular inner pressure sleeve portion 86 bounds an annular inner sleeve opening 59 and is in surrounding close-fitting relation with the cylindrical portion 64 of the hub. Pressure sleeve 84 is configured to be axially movable on the cylindrical portion 64 of the hub. The exemplary pressure sleeve 84 further includes an outer end pressure sleeve portion 88. The exemplary outer end pressure sleeve portion 88 comprises an annular portion that extends radially outward relative to the inner pressure sleeve portion 86. Outer end 88 includes an axially extending annular projection 55. The pressure sleeve includes an annular flange portion 53 that extends radially between the inner pressure sleeve portion 86 and outer end 88.

The exemplary kit 49 further includes an inboard bearing 90. The exemplary inboard bearing extends radially intermediate of the outer surface of the inner pressure sleeve portion 86 and an inner annular surface of the piston 72. Bearing 90 includes an inner race 97 and an outer race 99. The inner annular portion of the piston 72 includes a radially extending step 92 which is configured to be in abutting engaged relation with the outer race 99 of bearing 90. The pressure sleeve 84 further includes a radially outward extending step 94 which is configured to engage the inner race 97 of the inboard bearing 90. As can be appreciated, the axial movement of the piston 72 of the cylinder 68 causes the inboard bearing 90 and the pressure sleeve 84 to move axially relative to the cylindrical portion 64 of the hub 50. In addition, the inboard bearing 90 and the outboard bearing 82 enable the hub 52 to rotate with the transmission input shaft 56 while the cylinder 68 remains stationary.

As best shown in FIGS. 14 and 15, an inboard grease shield 93 overlies the inboard side of inboard bearing 90. Grease shield 93 is comprised of rigid material such as metal. A plurality of angularly spaced fasteners 95 are operative to hold grease shield 93 in engaged relation with the piston 72. The fasteners are disposed radially outward of the outer end 88 of the pressure sleeve 84. The exemplary inboard grease shield 93 terminates radially inwardly in an annular inboard grease shield opening surface 101. The exemplary pressure sleeve 84 includes an annular outer pressure sleeve surface 103. The annular outer pressure sleeve surface 103 includes an annular surface that extends parallel to the axis and radially outwardly bounds the step 94. An annular inboard grease release gap 107 extends radially between the annular outer pressure sleeve surface 103 and the annular inboard grease shield opening surface 101 which are in close fitting facing relation. The annular inboard grease release gap 107 is fixed and sized to provide a small radial gap sufficient to prevent metal to metal contact despite radial play in the bearings and despite dimensional changes that occur with thermal expansion. In the exemplary arrangement the outboard face of grease shield 93 radially overlies outboard bearing 90 and is somewhat axially disposed from the inner and outer races thereof. Further an axial gap 109 extends between the inboard face of grease shield 93 and the outboard face of annular flange portion 53. Of course it should be understood that this arrangement is exemplary.

The exemplary piston 72 further includes a radially extending lubricant passage 96. The lubricant passage 96 extends from a lubricant opening 98 in operative connection with the exterior surface of the piston, to an area between the inboard bearing 90 and the outboard bearing 82. The lubricant passage is configured to receive and hold a lubricant such as lubricating grease. In an exemplary embodiment as shown in FIG. 15 the lubricant opening 98 is configured to have a grease fitting 105 positioned therein. Alternatively opening 98 may be configured to accept a fitting of a lubricant hose or other conduit. As later discussed this enables lubricant such as a suitable grease to be delivered to the bearings of the exemplary embodiment.

As best shown in FIG. 14, hub 50 includes a plurality of angularly spaced holes 100 therein. Each of holes 100 extend parallel to axis 54 and are each sized for receiving a respective compression spring 102 therein. Each of the axially extending angularly spaced compression springs 102 extend in the axial direction and act to bias the pressure sleeve 84 toward the outboard end of the hub 66. This configuration is operative to cause the piston 72 to be biased towards an axially retracted position which causes fluid to be urged to exhaust from the variable volume cavity 76.

In the exemplary embodiment the kit 49 further includes a disc shaped backplate 104. The backplate 104 is configured to be attached to the hub 50 adjacent to the hub inboard end 63. The backplate 104 is held in engagement with the hub through a plurality of angularly spaced fasteners 106 as best shown in FIG. 14. The fasteners 106 extend in countersunk holes 108. The exemplary backplate 104 includes an annular central backplate opening 110 the purpose of which will be later discussed. An axially extending cylindrical hub projection 111 extends in central plate opening 110.

The exemplary kit further includes a pressure plate 112. The exemplary pressure plate 112 is configured to extend in surrounding relation of the splined portion 60 of hub 50. Pressure plate 112 includes a central splined inner plate opening 114, which is best shown in FIG. 13. The central splined inner plate opening 114 includes a plurality of angularly spaced inwardly directed splines 116 that are configured to engage the hub splines 62 on the hub splined portion 60. The hub splines 62 and the pressure plate splines 116 are configured to enable the pressure plate 112 to move axially on the splined portion 60 of the hub 50 when the hub splines 62 and the plate splines 116 are in engaged relation. The exemplary pressure plate 112 includes an outboard extending annular projection 113. The outboard extending annular projection 113 terminates radially outwardly at an annular plate step 115. In the exemplary arrangement the axially extending annular projection 55 at the outer pressure sleeve portion 88 outwardly overlies the annular plate step 115. In the exemplary arrangement the pressure plate 112 is configured to be in attached connection with the pressure sleeve 84 through fasteners 118. As a result the biasing force of the springs 102 is operative to also bias the pressure plate 112 toward the outboard end of the hub 50.

The exemplary conversion kit 49 further includes a disc pack generally indicated 120. The disc pack is positioned axially intermediate of the pressure plate 112 and the backplate 104. The exemplary disc pack includes at least two friction discs 122 and at least one separator disc 124. In exemplary disc pack arrangement one separator disc is positioned axially intermediate of each immediately axially adjacent pair of friction discs. In the exemplary disc pack 120 there are three friction discs 122 and two separator discs 124. Of course it should be understood that this arrangement is exemplary and in other embodiments other numbers of friction discs and separator discs may be used.

Each separator disc 124 includes a centered splined inner disc opening 126. The splined inner separator disc opening 126 includes a plurality of angularly spaced inward directed separator disc splines 128 as best shown in FIG. 13. The separator disc splines 128 are configured to engage the hub splines 62 of the hub splined portion 60. The separator discs are each configured to be axially movable relative to the hub splined portion with the hub splines 62 and the separator disc splines 128 in interengaging relation. This enables rotational force to be transferred from the separator discs 124 to the hub 50. Each separator disc includes axially extending annular projecting portions 117. In the exemplary arrangement the axially extending annular projecting portions 117 extend in both axial directions on each separator disc 124.

Each of the friction discs 122 includes an outer periphery 130 that extends further radially outward than an outer periphery 132 of each of the separator discs. The outer periphery of each friction disc includes a plurality of angularly spaced outward directed friction disc teeth or splines 134. The friction disc splines extend further radially outward than the outermost radial surfaces of each of the backplate 104 and the pressure plate 112. Each of the friction discs further include a circular friction disc inner opening 136. Each friction disc opening 136 is bounded by a disc inner surface 119. Each of the disc openings 136 is sized so as to position the friction disc 122 radially outward away from the splined portion 60 of the hub. Each disc inner surface 119 is disposed radially outwardly from the axially extending annular projecting portions 117 of the separator discs 124. The annular projecting portions 117 radially inwardly underlie at least a portion of each disc inner surface 119. This configuration enables each of the friction discs 122 to rotate relative to the hub without being in driving engagement therewith. Of course it should be understood that this arrangement of the disc pack is exemplary, and in other arrangements other approaches may be used.

In the exemplary arrangement the conversion kit 49 includes a drive ring 138. The exemplary drive ring includes an annular ring portion 140. The annular ring 140 extends axially and in surrounding relation of the disc pack 120. The exemplary drive ring 138 further includes a radially outward extending flange 142. The exemplary annular ring 140 has a plurality of angularly spaced inward directed axially elongated ring splines 144. The ring splines 144 are configured to interengage with the friction disc splines 134. The ring splines 144 and the friction disc splines 134 are configured to enable the friction discs 122 to axially move while the ring splines 144 and disc splines 122 remain in engagement. This enables rotational force to be transmitted from the drive ring 138 to the friction discs 122.

Figure 6:
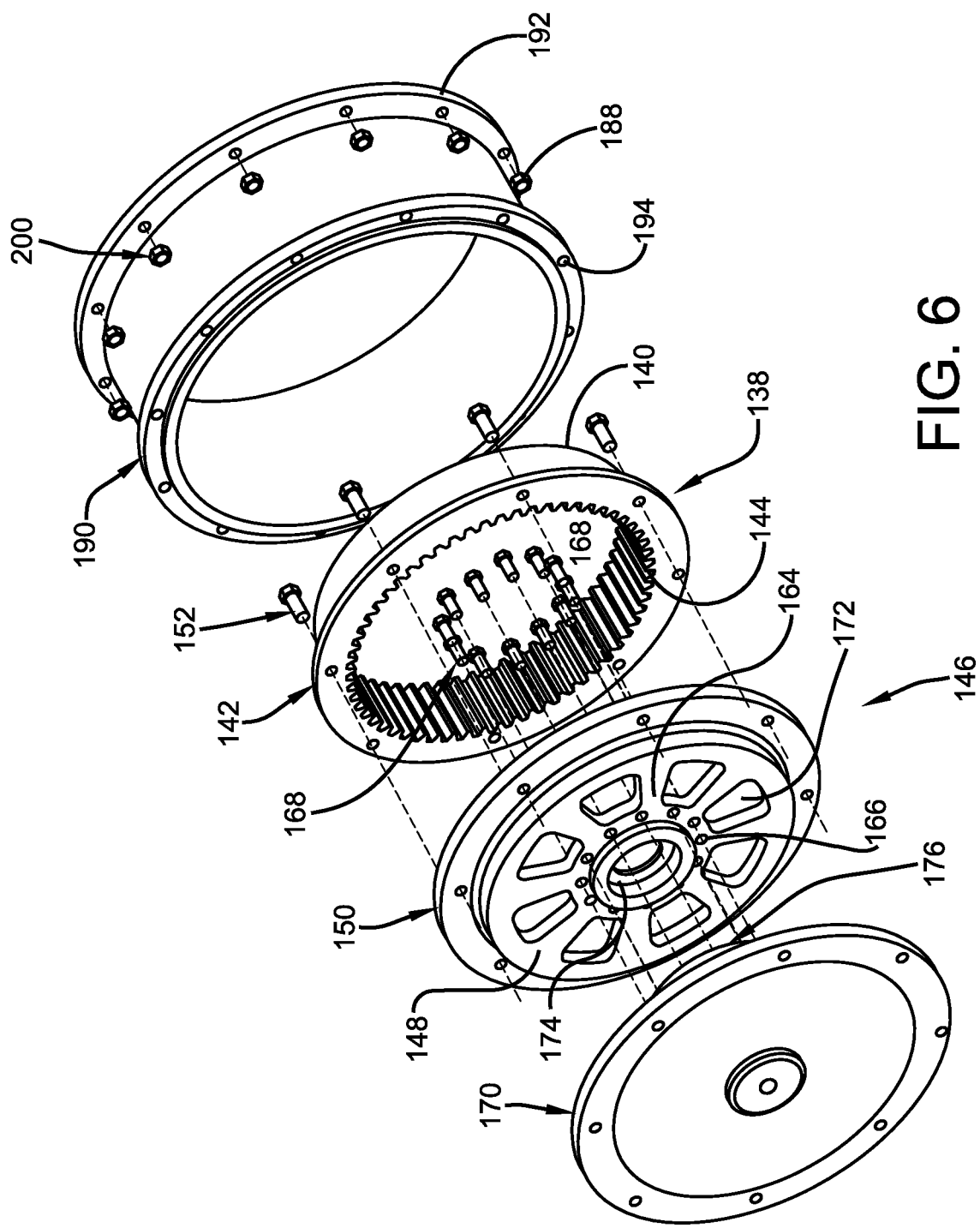
FIG. 6 is an enlarged perspective exploded view of a flexible drive coupling and a drive ring adapter, bell housing extension and drive ring of the clutch conversion kit.

In the exemplary arrangement the conversion kit 49 further includes a drive ring adapter 146. As also shown in FIGS. 5 and 6 the exemplary drive ring adapter includes a generally disc shaped body 148. The drive ring adapter 146 includes an annular adapter peripheral portion 150. The adapter peripheral portion 150 is configured to be attached in releasable operative engagement with the radially outward extending flange 142 of the drive ring 138. In the exemplary arrangement the peripheral portion 150 and the flange 142 are releasably engaged through a plurality of fasteners 152 which extend through openings in the flange and threadably engage in openings of the peripheral portion 150. The fasteners 152 are also included in the exemplary conversion kit.

The exemplary drive ring adapter 146 further includes an adapter ring recess 154. The adapter ring recess extends in an annular adapter sleeve portion 156 that extends on the outboard side of the drive ring adapter as best shown in FIG. 4. The adapter sleeve portion 156 extends within the annular backplate opening 110 of backplate 104. The exemplary conversion kit further includes an adapter bearing 158. The adapter bearing 158 is positioned in the adapter ring recess 154. The adapter bearing 158 includes a bearing central opening 160 that is configured to receive therein the inboard cylindrical extension 58 of the transmission input shaft 56. The adapter bearing 158 further includes an outer annular bearing surface 162. The outer annular bearing surface is configured to extend in close-fitting relation with the annular surface bounding the adapter ring recess 154. This enables the inboard cylindrical extension 58 of the transmission input shaft 56 to rotate in journaled relation with the drive ring adapter 146.

The drive ring adapter 146 further includes a radially extending adapter ring connector portion 164. The adapter ring connector portion comprises an annular portion that extends radially intermediate of the peripheral portion 150 and the central portion of the body 148 adjacent to the axis 54. The exemplary adapter ring connector portion 164 includes a plurality of angularly spaced fastener openings 166 as best shown in FIG. 6. A plurality of fasteners 168 which are included with the exemplary kit are configured to extend through the openings 166 and to threadably engage openings included in a flexible drive coupling 170 which is later described in detail. Alternatively in other embodiments the adapter ring connector portion may include a plurality of projections such as studs that may be used for connecting to the coupling. The exemplary adapter ring connector portion 164 further includes a plurality of angularly spaced cooling openings 172. The cooling openings extend parallel to the axis 54 and through the drive ring adapter 146. The cooling openings facilitate maintaining the clutch 40 within a suitable operating temperature range. Of course it should be understood that this approach is exemplary and in other embodiments other approaches may be used.

The exemplary drive ring adapter 146 further includes a central coupling recess 174. In the exemplary arrangement the central coupling recess 174 extends on the inboard side of the drive ring adapter 146. The central coupling recess 146 comprises a cylindrical recess that is configured to receive a cylindrical hub 176 of a flexible drive coupling 170 in generally close-fitting engagement. This arrangement of the exemplary embodiment provides centering support for the drive ring adapter 146 and the fluid actuated clutch assembly adjacent the inboard end of the transmission input shaft 56. Of course it should be understood that this approach is exemplary and that in other embodiments other approaches may be used.

Figure 7:
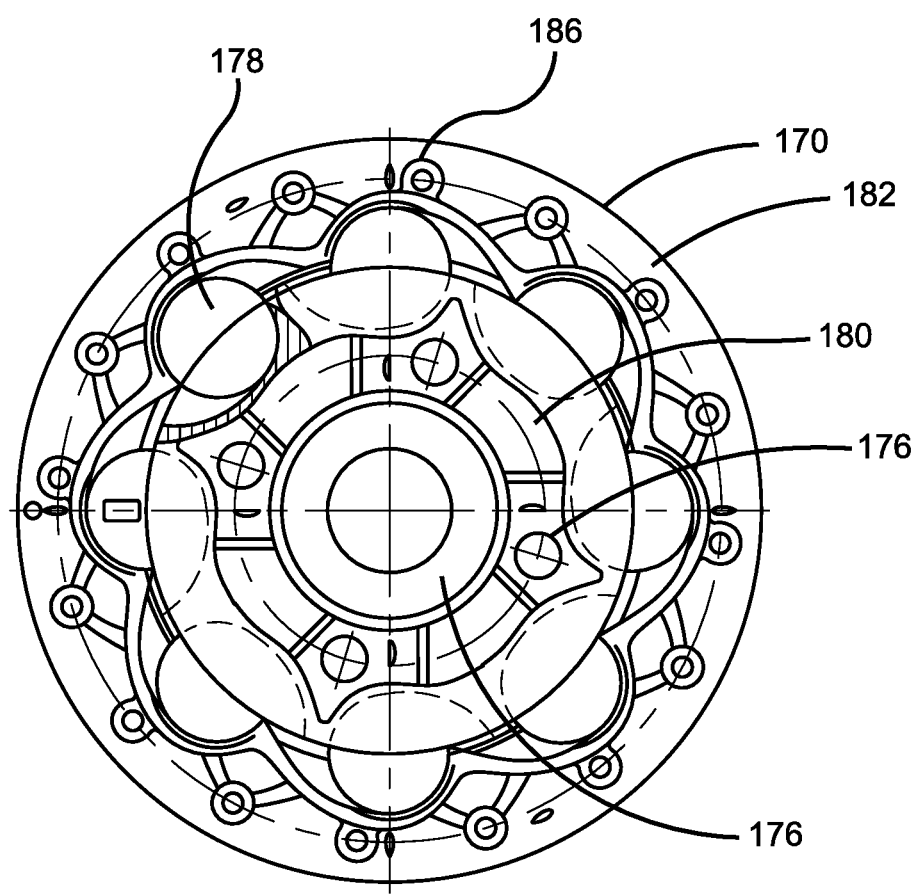
FIG. 7 is a back view of the exemplary flexible drive coupling.
Figure 8:
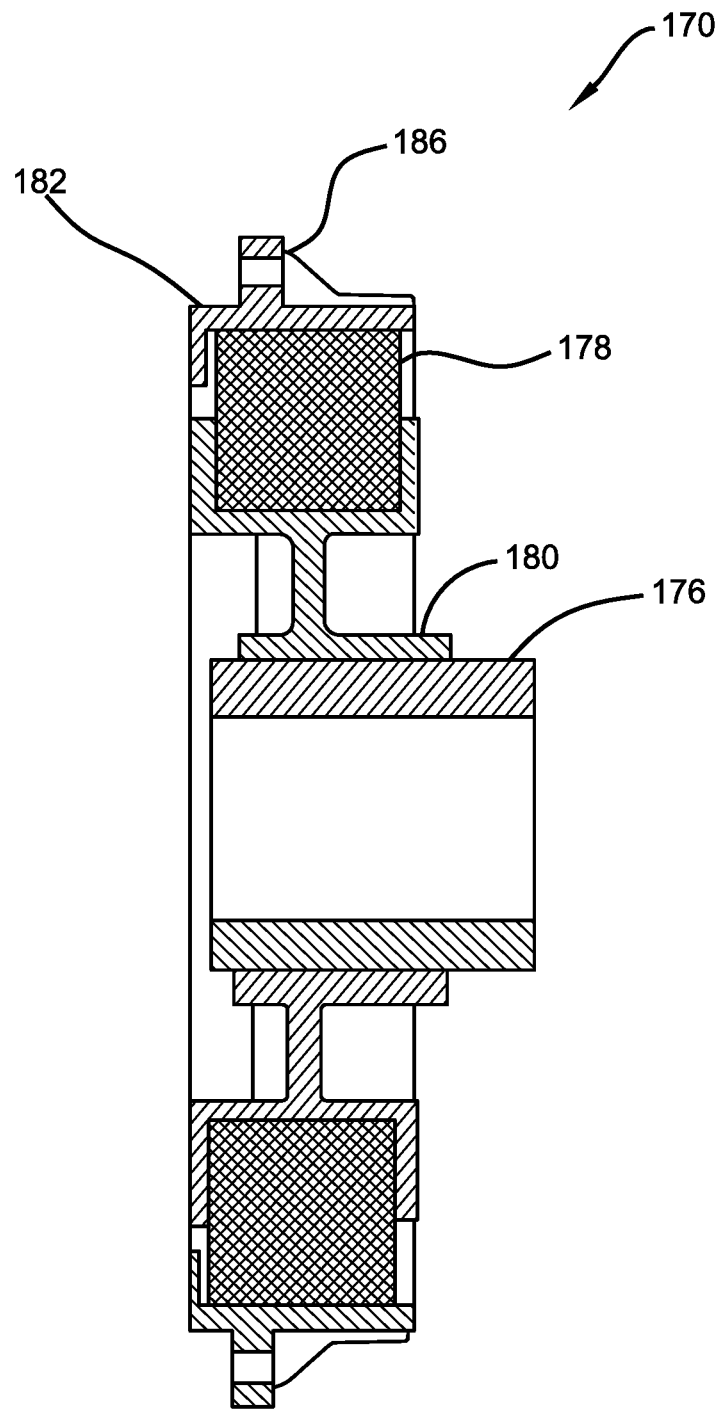
FIG. 8 is a cross-sectional view of an exemplary flexible drive coupling.
Figure 9:
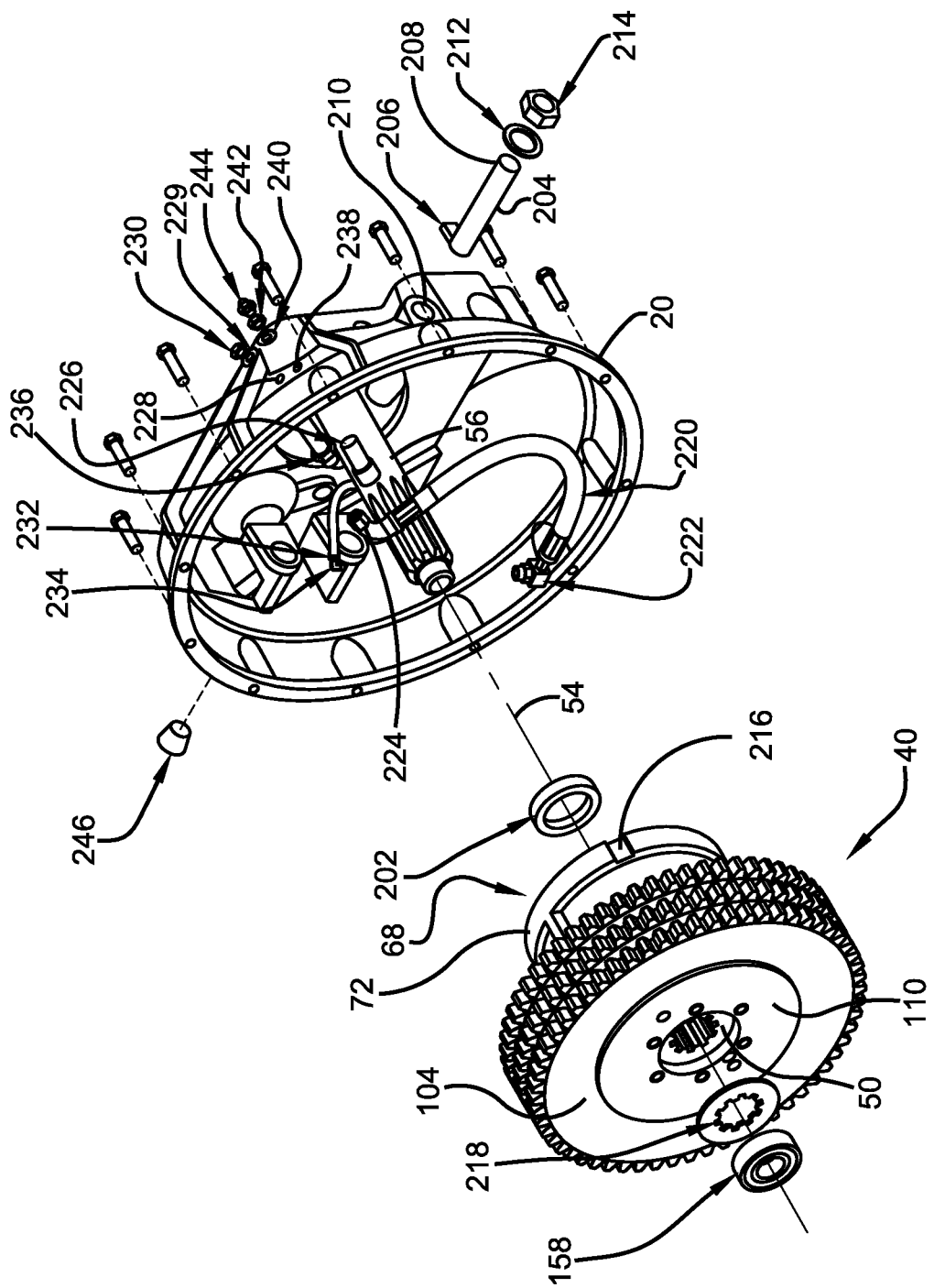
FIG. 9 is an enlarged perspective view of a bell housing and clutch components of the exemplary conversion kit.

In some arrangements the flexible drive coupling 170 may be included in the conversion kit or alternatively it may be procured by the person installing the components of the conversion kit separately. The flexible drive coupling in exemplary embodiments is operative to provide attenuation of torsional vibration. This enables quieter meshing of the gears of the transmission, lower internal clutch temperatures, longer uptime and improved reliability. In the exemplary arrangement shown the flexible drive coupling 170 comprises a roller coupling which includes a plurality of rubber bodies which are alternatively referred to as rollers 178. The rubber rollers extend operatively between a radially inner portion 180 and a radially outer portion 182 of the coupling 170. This arrangement provides for progressive torque transmission and reducing chatter and hammer affects that might otherwise result during clutch engagement. In the exemplary arrangement the plurality of fasteners 168 engage respective threaded openings 184 in the inner portion 180 as shown in FIG. 7. The outer portion 182 of the drive coupling includes a plurality of angularly spaced openings 186. Spaced openings 186 are configured for receiving respective fasteners that are operative to releasably engage the drive ring coupling 170 and the flywheel 14 which is attached to the engine 12 of the truck. In the exemplary arrangement the flexible drive coupling 170 may comprise a Centaflex-R flexible coupling which is commercially available from CENTA Antriebe Kirschey GmbH of Germany. Of course it should be understood that this particular product is exemplary and in other embodiments other types of flexible drive couplings may be used. For example, alternative flexible torsional couplings may operate based on principles of using resilient materials in shear or compression. Other alternatives may provide for torsional damping through the use of springs such as helical springs or leaf springs. Alternative arrangements may utilize features described in U.S. Provisional Application 62/853,322 filed May 28, 2019.

In some exemplary embodiments the exemplary kit 49 may further include an annular bell housing extension 188. A bell housing extension is used in exemplary arrangements where the clutch components of the conversion kit have an axial length greater than can be accommodated by the bell housing 20 originally provided on the vehicle. In the exemplary arrangement the bell housing extension includes an inboard flange 190 and outboard flange 192. As best shown in FIGS. 5 and 6 the exemplary inboard flange includes a plurality of angularly spaced fastener openings 194. The openings 194 are configured to align with threaded openings in the engine block or other structures that receive threaded fasteners of the type originally used to engage the engine 12 and the bell housing 20 before the installation of the conversion kit. The exemplary outboard flange 192 includes a plurality of angularly spaced openings 196. Openings 196 are configured to receive fasteners 198 such as bolts which enable the connection of the bell housing 20 and the outboard flange. In the exemplary arrangement a plurality of nuts 200 engage the bolts to provide a firm connection between the bell housing 20 and the bell housing extension 188. Of course it should be understood that this arrangement is exemplary and in other embodiments other approaches may be used.

The exemplary kit 49 further includes a shaft collar 202. The shaft collar 202 is configured to extend in surrounding relation of the transmission input shaft 56 and to be in locked engagement therewith. In the exemplary arrangement the shaft collar 202 serves as a stop that prevents axial movement of the hub in an outboard direction. The shaft collar is locked onto the transmission input shaft 56 so that the hub cannot axially move any closer to the bell housing 20 than the desired position which is set using the shaft collar 202. In exemplary arrangements the shaft collar may be a split collar that is locked in position using fasteners, or other type of collar that can be fixed and held in a set axial position.

The exemplary kit 49 further includes a pin 204. The exemplary pin 204 includes a foot 206. The foot 206 is configured to be positioned at a radially inward end of the pin 204 when the pin is installed in the bell housing 20. The exemplary pin is configured at an end opposite to the foot to extend through an opening 210 in the bell housing 20. The opening 210 is open and unused due to the removal of the lever actuated dry clutch from the exemplary bell housing. The exemplary pin 204 is configured to have end 208 extend through the opening 210 and be locked in fixed connection with the bell housing through the use of a locking washer 212 and a nut 214 that are also part of the exemplary kit.

In an exemplary arrangement when the pin 204 is installed the pin extends radially inwardly relative to the input shaft 56. The foot 206 which is elongated in a direction parallel to the axis 54 of the shaft 56, is configured to be mounted a particular radial distance that is disposed away from the axis 54. The exemplary cylinder 68 includes a notch 216 in an external surface of the piston 72. The notch 216 is sized to accept the foot 206 therein. The engagement of the foot 206 of pin 204 in the notch 216 of the piston 72 serves to hold the cylinder 68 in a fixed rotational position within the bell housing 20. This exemplary configuration prevents the cylinder 68 from rotating while allowing the axial movement of the piston 72 relative to the cylinder. This enables the piston to move axially toward the pressure plate and the disc pack responsive to fluid supplied to the cavity 76, and axially away from the pressure plate and disc pack when fluid is allowed to be exhausted from the cavity. Of course it should be understood that this approach is exemplary and other embodiments other approaches may be used.

The exemplary kit 49 further includes a spacer 218. The exemplary spacer is provided to occupy any excess axial space that may exist in the backplate opening 110 between the adapter bearing 158 and the inboard face of the hub 50 that bounds the recess. The exemplary spacer 218 reduces the risk of any axial inboard movement of the hub during operation of the clutch 40. The axial width of the spacer 214 that is provided with the kit may vary depending on the particular dimensions of the hub and the transmission input shaft 56. Further, in some embodiments the dimensions of the components may be such that the spacer 158 is not required to be included in the kit.

The exemplary kit 49 further includes a pressure line 220. The pressure line 220 serves to deliver fluid pressure to the pressure fitting opening 78 on the piston 72 of cylinder 68. In the exemplary arrangement the pressure line comprises a flexible hose. The pressure line 220 includes an internal fitting 222 that is configured to threadably engage the pressure fitting opening. The pressure line 220 further includes an outer end fitting 224. The outer end fitting 224 is configured to engage an actuator fitting 226. The actuator fitting 226 extends through an opening 228 in the bell housing 20 and is secured therein by a lock washer 229 and a nut 230. In the exemplary arrangement the opening 228 must be drilled by the installer in the bell housing. The actuator fitting 226 when installed is used to supply the fluid pressure that causes movement of the piston 72 of cylinder 68. The actuator fitting 226 is shown in its installed position in FIG. 10.

The exemplary kit 49 further includes a lubricant line 232. Lubricant line 232 of the exemplary embodiment comprises a flexible hose. The lubricant line 232 has a fitting 234 at an inward end thereof. The fitting 234 is configured to threadably engage the lubricant opening 98 in the piston 72 of cylinder 68. This arrangement may be utilized in some embodiments when a grease fitting 105 cannot be directly accessed from outside the clutch assembly. The lubricant line to 232 includes a fitting at an opposed end which is configured to engage a fitting 236 that extends through an opening 238 in the bell housing. The exemplary fitting 236 is held engaged in the opening 238 by washer 240 and nut 242. In the exemplary arrangement the opening 238 in the bell housing is drilled in the desired position by the installer of the components of the kit.

In the exemplary arrangement the fitting 236 is in operative connection with a grease accepting fitting 244. Grease fitting 244 may have a configuration similar to grease fitting 105. Grease fitting 244 is configured to accept lubricant such as grease therein that is delivered from a suitable grease gun or other lubricant delivery device. The exemplary grease fitting 244 further includes a check ball or other arrangement that prevents grease from passing back outward through the grease fitting 244 once lubricant has been provided through the fitting and into the lubricant line 232. In the exemplary arrangement a suitable lubricant is passed from the fitting through the lubricant line 232 and into the radially extending passage 96 to an area of the cylinder 68 between the inboard bearing 90 and the outboard bearing 82. Of course it should be understood that this lubricating arrangement is exemplary and other embodiments other approaches may be used.

The exemplary kit 49 further includes a stopper plug 246. The exemplary stopper plug 246 is configured to be extended in an opening 248 of the bell housing. The opening 248 extends through an exterior surface of the bell housing that is open due to the removal of the lever actuated dry clutch. The exemplary plug 246 is configured to extend in the external end of the opening 248 so as to block the opening and prevent the introduction of dirt and other contaminants into the bell housing. Of course the use of a stopper plug as part of the kit is exemplary and other embodiments other approaches and devices may be used for blocking openings that remain unoccupied as a result of removal of the lever actuated dry clutch and after all the components of the kit have been installed.

In an exemplary arrangement the components of the kit 49 are installed through performance of a method that includes initially removing the drive shaft 22 and transmission 16 from the truck 10. In exemplary methods such removal requires the disconnection of the bell housing 20 from the engine 12 and the disconnection of the dry clutch components from the flywheel 14. Such removal also includes disconnecting the clutch pedal 32, and the linkage 34 from the bell housing.

The exemplary method further includes removing the lever 36 from the interior the bell housing along with any other components of the lever actuated clutch. This results in the bell housing being open for the installation of the components of the kit. In the exemplary method with the bell housing interior now generally open, an installer drills the holes 228, 238 through the bell housing and installs the fittings 226 and 236 in the holes. The installer then may connect the pressure line hose 220 and the lubricant line hose 232 to the fittings that extend through the bell housing. In exemplary methods the bell housing may remain in connection with the transmission during these steps.

Figure 10:
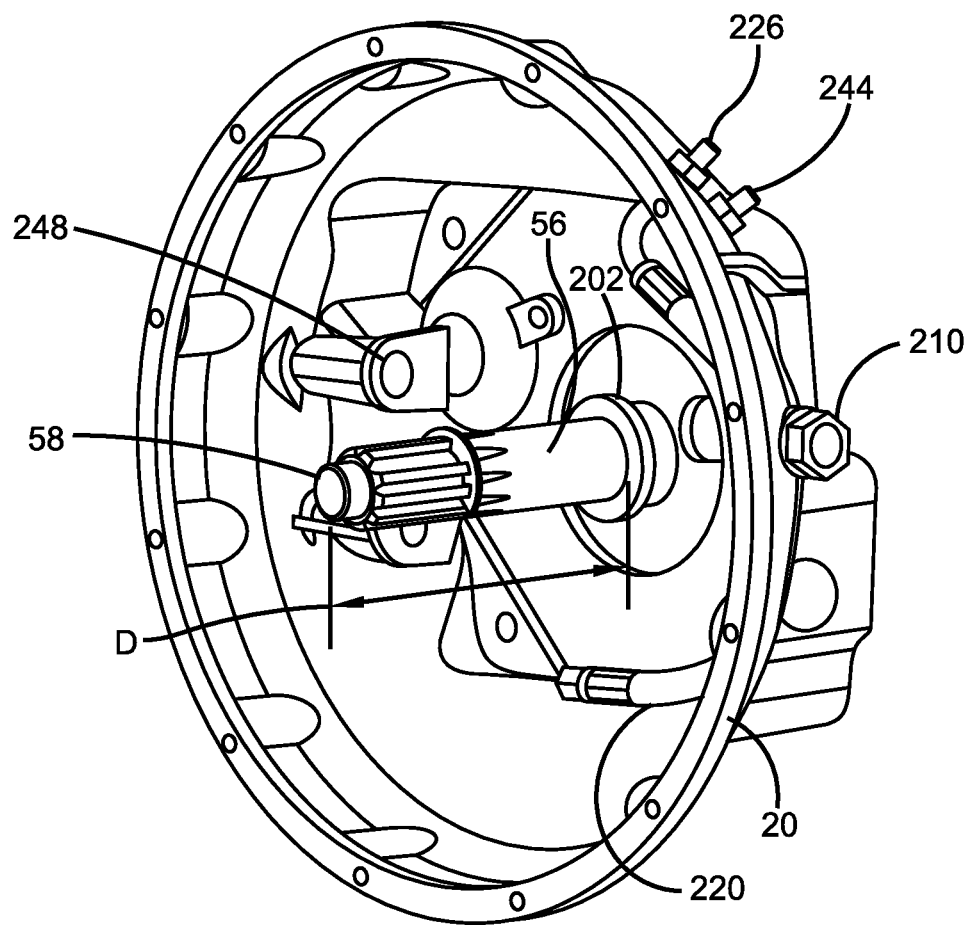
FIG. 10 is a perspective view of an exemplary bell housing with components of the conversion kit installed.
Figure 12:
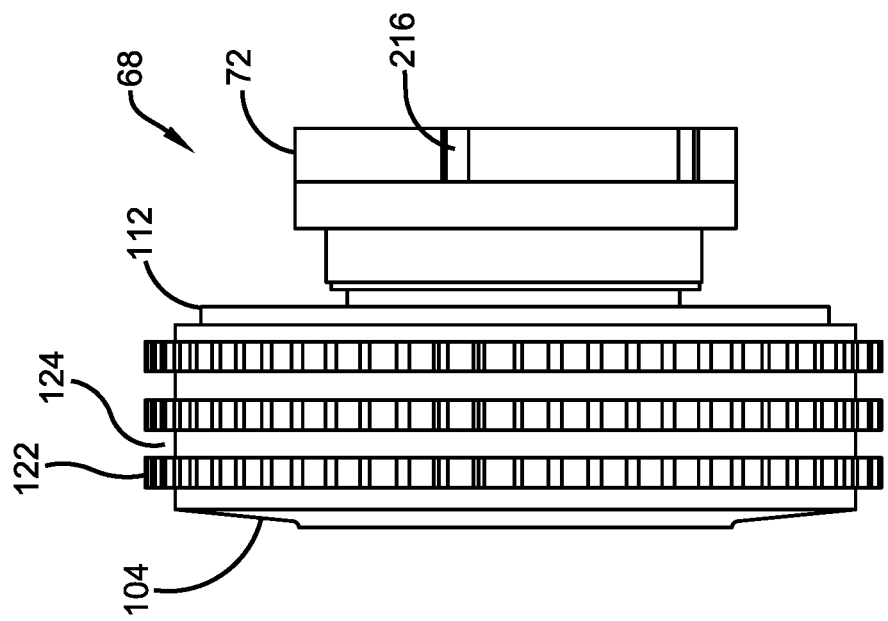
FIG. 12 is a front view of a backplate and friction discs of an exemplary conversion kit.
Figure 11:
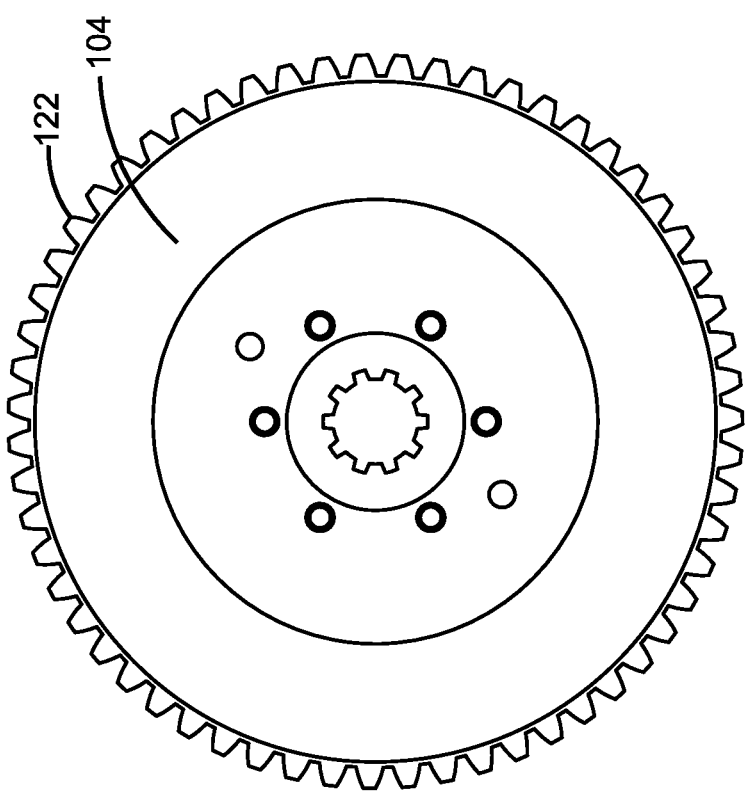
FIG. 11 is a side view of an exemplary hub, cylinder, pressure plate, backplate and disc pack of the conversion kit.

The installer then positions the shaft collar 202 at the required position on the transmission input shaft 56. This is represented in FIG. 10 by the dimension arrow D, which is the outboard distance as measured by the installer from the cylindrical extension 58. The installer then locks the shaft collar 202 in the proper position. The installer may also install the pin 204 in the opening 210, and lock the pin in position using the washer 212 and nut 214. Of course it should be understood that the steps can be done at other times in the assembly sequence prior to the final placement of the clutch 40 in the bell housing.

In the exemplary method the installer then assembles the kit components which make up the cylinder 68, the inboard bearing 90 and the outboard bearing 82 and the pressure sleeve 84. This includes the assembly of the grease shields 79, 93 and related fasteners, as well as the annular retainer 81 and related fasteners. The springs 102 are also installed in the holes 100 which extend in the hub 50.

In accordance with the exemplary method the cylinder 68 in an assembled condition, and the pressure sleeve 86 are extended onto the cylindrical portion 64 of the hub 50 from the outboard end 66 of the hub. The pressure plate 212 is then extended onto the splined portion of the hub 60 and moved toward the outboard end of the hub so as to be in engagement with the pressure sleeve 84. The fasteners 118 are then extended to engage the pressure plate 212 and the pressure sleeve 84.

In accordance with an exemplary method the disc pack 120 including the friction discs 122 and separator discs 124 are then installed in surrounding relation of the hub splined portion 60. As previously discussed, the separator discs 124 are axially positioned intermediate of immediately axially adjacent friction discs 122. The exemplary disc pack 120 includes three friction discs and two separator discs. However, in other embodiments different numbers of friction discs and separator discs may be used as part of the disc pack.

Once the discs included in the disc pack have been installed in surrounding relation of the spline portion 60 of the hub 50, the backplate 104 is installed. The backplate 104 is installed by engaging the fasteners 106 in the openings in the backplate to engage threaded openings in the hub 50.

The drive ring 138 is positioned so that the ring portion 140 is in engagement in surrounding relation with the disc pack 120. The drive ring is positioned so that the friction disc splines 134 are in engagement with the ring splines 144 on the drive ring 138. As can be seen in FIG. 4 for example, the ring portion 140 and the ring splines 144 thereon are disposed radially outward from the outer periphery of both the pressure plate 112 and the backplate 104. As a result the drive ring 138 is able to rotate independently of the hub when the discs in the disc pack 120 are not held rotatably engaged by the axial force applied through the pressure plate 112.

In an exemplary method of installation the flexible drive coupling 170 is attached in fixed engagement with the flywheel 14. This is done through the extension of fasteners through the openings 186 of the coupling 170. A plurality of angularly spaced fasteners hold the flexible drive coupling 170 in fixed rotatable engagement with the flywheel.

Further in the exemplary method the drive ring adapter 146 is engaged with the flexible coupling 170. This is done by initially engaging the cylindrical hub 176 on the coupling in the coupling recess 174 of the drive ring adapter. The close-fitting engagement of the cylindrical hub 176 in the coupling recess 174 positions the drive ring adapter in centered relation with the coupling and provides support for the drive ring adapter. In this engaged relation the drive ring adapter 146 may be rotated relative to the coupling 170 so as to align the openings 166 in the drive ring adapter with the openings 184 and the flexible coupling. The fasteners 168 are then engaged to hold the driving adapter in fixed rotatable engagement with the coupling.

In accordance with an exemplary method the spacer 218 is positioned in the adapter ring recess 154. Adapter bearing 186 is then positioned in the adapter ring recess 154 in inboard overlying relation of the spacer 218. The drive ring 138 is then engaged with the drive ring adapter 146. This is accomplished in an exemplary arrangement by extending the plurality of fasteners 152 through the openings in the flange 142 of the drive ring and engaging the fasteners in the threaded openings in the peripheral portion 150 of the drive ring adapter 146.

If the particular kit includes a bell housing extension 188, the method may then include engaging the bell housing extension with the engine or related engine structure to which the bell housing was originally connected. This may be accomplished by extending the fasteners that were originally used to hold the bell housing in position through the openings 194 in the inboard flange 190. The fasteners are then threaded into the engine or other support structure to hold the bell housing extension 188 in position.

In accordance with an exemplary installation method the transmission and bell housing are brought into axial alignment with the hub opening 52 of the hub 50. The input shaft 56 and the transmission may then be moved inboard so that the cylinder 68 is within the bell housing 20. In an exemplary arrangement sufficient access is provided so that the pressure line 220 and a lubricant line 232 may be connected to their respective connectors on the piston 72 and tightened. The bell housing 20 may then be moved relative to the cylinder 68 so that the foot 206 on the pin 204 moves into engagement with the notch 216 on the exterior surface of the piston 72. The transmission is continued to be moved in the inboard direction until the inboard cylindrical extension 58 on the input shaft 56 is engaged with the inner diameter of the adapter bearing while the outboard end of the hub 66 is in engagement with the shaft collar 202. Once in this position the components are an axial operational orientation.

In the exemplary method the fasteners 198 are aligned with and extended through the openings in the flange 192. The nuts 200 are attached to the fasteners and tightened. The plug 246 may then be installed in the opening 248. Prior to closing the opening with the plug the installer may visually inspect the interior of the bell housing through the opening to be sure that the pressure line 220 and lubricant line 232 are not kinked or binding.

The installer will then connect an appropriate pressure line to the actuator fitting 226. Lubricant may also be dispensed into the grease fitting 244. The pressure line to the actuator fitting which controls the clutch will be extended to be in operative fluid connection with the control valve 44.

In some exemplary installations where the bell housing extension 188 has been used, provisions are made for changing the length of the drive shaft 22 and/or repositioning the shift lever 38. These are actions that can be done before the installation of the components of the kit are commenced. With the driveshaft appropriately shortened and the shift lever 38 relocated, the installation activity is completed. Of course if the bell housing extension 188 is not used there is no need to modify the driveshaft or relocate the shift lever.

It should be mentioned that in some exemplary arrangements the installation of the conversion kit may be particularly useful where a truck is being converted from a human operator only vehicle to self driving capabilities. The conversion to the fluid actuated clutch enables a controller to control the engagement and disengagement of the clutch as appropriate for the current driving conditions. In addition, an appropriate electromechanical actuator may be applied to or may replace the shift lever 38 so that the gears of the manual transmission 16 can be shifted in response to a controller. The durability of the exemplary fluid actuated clutch provides enhanced capabilities that may be particularly suited for electronic controls which eliminate the need for driver actuated clutch pedal or linkage mechanisms. Of course it should be understood that other arrangements may be configured so that the foot actuated clutch pedal may be retained and used in the same manner as when the truck was operated using the lever actuated clutch.

It should be appreciated that the steps described in the foregoing method need not all be performed in some circumstances nor in the order described. Numerous different assembly processes may be used depending on the desires of the installer. Further in certain applications the bell housing and/or bell housing extension may include access ports, removable doors or other features that enable the assembly of the different components in different sequences that may be deemed more desirable by particular installers.

Once the installation of the components of the conversion kit 49 are complete, the truck may be operated using the fluid actuated clutch 40 to operatively drivingly engage and disengage the engine 12 from the transmission 16. As can be appreciated from the foregoing description, the application of fluid pressure to the pressure fitting opening 78 causes fluid to act in the cavity 76 to increase the volume of the cavity. This causes the piston 72 to move axially away from the housing 70. The axial movement of the piston 72 toward the disc pack causes the pressure sleeve 84 to move the pressure plate 112. When the pressure plate 112 moves toward the backplate 104 the discs in the disc pack are compressed together. This causes the discs to transmit the rotational force of the engine through the drive ring to the hub 50 and to the input shaft 56 of the transmission.

The release of the fluid pressure from the pressure fitting opening 78 causes the cavity 76 to decrease in volume as the springs 102 bias the pressure plate and the piston in the axial direction inwardly in the housing. The movement of the pressure plate 112 causes the discs in the disc pack to no longer be compressed together. This causes the drive ring rotation to no longer be transmitted to the hub as the friction discs are enabled to rotate without causing movement of the intermediate separator discs.

As can be appreciated, exemplary embodiments of the clutch 40 may be operated in some applications using hydraulic liquid fluid for purposes of actuating the clutch. In other arrangements pneumatic pressure may be utilized for purposes of actuating the clutch. The choice of the actuation fluid may dictate that some dimensional aspects or materials such as resilient seals be different in the respective conversion kits. However regardless of the nature of the actuating fluid, the principles of operation as described herein will generally be the same.

In exemplary arrangements, the clutch capability provided by the conversation kit enables greater working capacity and torque transmission capability than is achievable using the dry clutch arrangement. Exemplary arrangements may also provide for longer periods between clutch replacement/refurbishment than with the dry clutch or other power transmission arrangements.

The exemplary clutch further includes a lubricant arrangement that provides advantages compared to resilient labyrinth seals and other resilient sealing arrangements. The exemplary lubrication arrangement is particularly useful in connection with severe service clutch applications that experience high temperatures.

As can be appreciated particularly from FIG. 15, lubricating grease or other lubricant material may be injected into the lubricant passage 96 and into the area between the inboard thrust bearing 90 and the outboard bearing 82. The lubricant so injected also contacts and facilitates movement of the piston 72 relative to the housing 70 as well as movement of the pressure sleeve 84 relative to the cylindrical portion 64 of the hub 50. In the exemplary arrangement the lubricant also passes between the angularly disposed balls that extend between the races of the bearings and into the axial gaps between the bearing races and the inside surfaces of the grease shields. This enables lubricant to reach the relatively moving areas inside the piston and the housing where lubrication is needed.

In the exemplary arrangement the fixed annular grease release gaps 61 and 107 enable excess grease or other lubricant material to escape from the area bounded by the grease shields in the event that the area is overfilled with grease. This reduces the risk of overheating due to excessive packing with grease or other lubricant material. Further, in the exemplary arrangement the grease shields 79 and 93 serve to hold the grease or other lubricant within the area between the grease shields when the lubricant is moved radially outward due to centrifugal forces. This is because each of the grease shields is in fixed attached connection with a respective one of the housing and the piston at the radially outer periphery thereof which prevents the escape of the lubricant during clutch operation. Further this exemplary configuration helps to hold the lubricant in the area between the grease shields even under operating conditions at high temperatures when the lubricant may become less viscous and more free flowing.

Further in the exemplary arrangement the radially outward directed centrifugal forces tend to move the grease or other lubricant material away from the grease release gaps 61, 107 so that the gaps are open to atmosphere. This further helps to enable the release of excessive grease that may be present initially through the gaps and also helps to facilitate cooling. Further in the exemplary arrangement in which the grease shields are comprised of a generally rigid metal plate material, there is no risk of damage to resilient seal compounds due to high temperatures of the clutch components or high pressures that may develop in the area between the grease shields.

Further it should be understood that while the exemplary clutch configuration is utilized in connection with a conversion kit used in connection with trucks, the clutch arrangement and features described herein may also be used with different devices and systems. For example, exemplary clutch arrangements including the features described herein may be used in connection with systems that produce water jets, winch systems, heavy-duty pumps that are used to pump mud or slurries, drilling rigs, grain mixing systems, feed screws and other types of clutch applications.

Thus the new and useful apparatus and methods of the exemplary embodiments achieve desirable objectives, eliminate difficulties encountered in the use of prior devices and systems, solve problems, and attain the desirable results and benefits described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the inventive features are not limited to the exact details shown or described. Further, when it is stated herein that a feature, element, or structure extends in, or is extending in, surrounding relation of a certain other feature, element, or structure, it should be understood that this language also means that the feature, element, or structure extends in, or is extending in, surrounding relation to the certain other feature, element, or structure.

Having described the features, discoveries and principles of the exemplary embodiments, the manner in which they are constructed and operated, and the advantages and useful results attained; the new and useful structures, devices, elements, arrangements, parts, combinations, systems, equipment, operations, methods, processes and relationships are set forth in the appended claims.

We claim:
1. Apparatus comprising:
   a fluid actuatable clutch including
   a cylindrical hub,
   wherein the hub includes
   an axially elongated hub opening configured to receive a shaft therein,
   an axially elongated hub splined portion, wherein the hub splined portion includes a plurality of radially outwardly directed, angularly spaced axially elongated hub splines,
   a circular backplate, wherein the backplate
   is in fixed operative connection with the hub,
   includes a circular central plate opening, wherein the central plate opening is configured to extend in surrounding relation to the shaft,
   a circular pressure plate,
   wherein the pressure plate includes a central circular splined plate opening, wherein the plate opening includes a plurality of angularly spaced radially inward directed plate splines,
wherein the plurality of plate splines are in interengaged relation with the plurality of hub splines,
and wherein the pressure plate is axially movable relative to the hub while the plate splines and the hub splines are in interengaged relation,
at least one circular friction disc,
wherein the at least one friction disc is axially intermediate of the backplate and the pressure plate,
wherein each friction disc includes
a circular inner disc opening bounded by an annular disc inner surface, wherein the hub extends in the disc opening and the disc inner surface is disposed radially outward from the hub such that the friction disc is rotatably movable independent of the hub,
a splined outer disc surface, wherein the splined outer disc surface includes a plurality of angularly spaced radially outward directed disc splines,
wherein the disc splines are configured to axially movably interengage a plurality of radially inward directed angularly spaced drive ring splines on an annular drive ring that extends in surrounding relation to each friction disc,
an annular pressure sleeve,
wherein the pressure sleeve
extends in surrounding relation to the hub,
includes an annular outer pressure sleeve surface,
is axially movable in operative supported connection with the hub,
is operatively engageable with the pressure plate such that axial movement of the pressure sleeve relative to the hub is operative to cause axial movement of the pressure plate relative to the hub,
an annular clutch housing,
wherein the annular clutch housing extends in surrounding relation to the hub,
an annular clutch piston, wherein the clutch piston extends in surrounding relation to at least a portion of the housing and at least a portion of the pressure sleeve,
wherein a variable volume annular chamber axially extends between the housing and the piston, wherein the piston is configured to be axially movable relative to the housing responsive to variation in volume of the chamber,
an axially inboard thrust bearing,
wherein the inboard thrust bearing
includes a relatively rotatably movable thrust bearing inner race and a thrust bearing outer race, and
extends radially between the pressure sleeve and the piston,
an axially outboard bearing,
wherein the outboard bearing
includes a relatively rotatably movable outboard bearing inner race and an outboard bearing outer race, and
extends radially between the hub and the housing,
an annular inboard grease shield,
wherein the inboard grease shield
is in fixed operative connection with the piston,
radially overlies at least a portion of the inboard thrust bearing,
includes a circular inboard grease shield opening bounded radially inwardly by an annular inboard grease shield opening surface,
wherein the inboard grease shield opening surface is in facing close-fitting adjacent relatively movable relation with the annular outer pressure sleeve surface,
wherein a fixed annular inboard grease release gap extends between the inboard grease shield opening surface and the outer pressure sleeve surface,
an annular outboard grease shield,
wherein the outboard grease shield
is in fixed operative connection with the housing,
radially overlies at least a portion of the outboard bearing,
includes a circular outboard grease shield opening bounded radially inwardly by an annular outboard grease shield opening surface,
an annular outer hub ring surface, wherein the outer hub ring surface is in fixed operative connection with the hub,
wherein the outboard grease shield opening surface is in facing close-fitting adjacent relatively movable relation with the outer hub ring surface, wherein a fixed annular outboard grease release gap extends between the outboard grease shield opening surface and the outer hub ring surface.

2. The apparatus according to claim 1
wherein a radially extending passage extends intermediate of the inboard thrust bearing and the outboard bearing,
wherein the radially extending passage is configured to receive lubricating grease.

3. The apparatus according to claim 1
wherein a radially extending passage extends intermediate of the inboard thrust bearing and the outboard bearing,
wherein the radially extending passage is configured to receive lubricating grease,
and further including,
a grease fitting in operative connection with the piston, wherein the grease fitting is fluidly connected with an opening that extends in the piston to the radially extending passage.

4. The apparatus according to claim 1
wherein the pressure sleeve includes an annular radially outward extending sleeve step that is in abutting engagement with the inboard thrust bearing inner race, and the piston includes an inner radially inward extending piston step that is in abutting engagement with the inboard thrust bearing outer race,
wherein increased volume of the chamber is operative to cause the inward extending piston step to cause axial movement of the inboard thrust bearing and the pressure sleeve to move the pressure plate axially toward the at least one friction disc.

5. The apparatus according to claim 1
wherein the hub includes a constant diameter outer hub portion axially disposed from the hub splined portion, wherein the pressure sleeve includes an annular inner sleeve opening in surrounding relation to the constant diameter outer hub portion, wherein the pressure sleeve is axially movable in engagement with the constant diameter outer hub portion.

6. The apparatus according to claim 1
wherein the clutch housing includes an annular radially inward extending housing step,
and further including
an annular retainer, wherein the annular retainer is in fixed operative connection with the hub and includes a radially outward extending retainer step,
wherein the retainer includes the outer hub ring surface,
wherein the radially inward extending housing step is in abutting engagement with the outer race of the outboard bearing,
and wherein the radially outward extending retainer step is in abutting engagement with the inner race of the outboard bearing.

7. The apparatus according to claim 1
wherein the clutch housing includes an annular radially inward extending housing step,
and further including
an annular retainer, wherein the annular retainer is in fixed operative connection with the hub and includes a radially outward extending retainer step,
wherein the retainer includes the outer hub ring surface,
wherein the radially inward extending housing step is in abutting engagement with the outer race of the outboard bearing,
and wherein the radially outward extending retainer step is in abutting engagement with the inner race of the outboard bearing,
wherein the annular retainer is releasably attached to the hub by a plurality of angularly spaced retainer fasteners.

8. The apparatus according to claim 1
wherein the pressure sleeve includes an annular flange portion that extends radially outward beyond the annular outer pressure sleeve surface,
wherein an axial gap extends between the annular flange portion and the inboard grease shield.

9. The apparatus according to claim 1
wherein the pressure sleeve includes an annular flange portion that extends radially outward beyond the annular outer pressure sleeve surface,
wherein an axial gap extends between the annular flange portion and the inboard grease shield,
wherein the flange portion terminates radially outwardly at an annular outer end portion, wherein the inboard grease shield is held in fixed engagement with the piston by a plurality of angularly spaced piston fasteners, wherein all the piston fasteners are disposed radially outward of the outer end portion.

10. The apparatus according to claim 1
wherein the pressure sleeve includes an annular flange portion that extends radially outward beyond the annular outer pressure sleeve surface,
wherein an axial gap extends between the annular flange portion and the inboard grease shield,
wherein the flange portion terminates radially outwardly at an annular outer end portion,
wherein the inboard grease shield is held in fixed engagement with the piston by a plurality of angularly spaced piston fasteners, wherein all the piston fasteners are disposed radially outward of the outer end portion, wherein the outer end portion of the annular flange portion includes an axially extending annular projection,
wherein the pressure plate includes an annular plate step,
wherein the axially extending annular projection radially outwardly overlies the annular plate step.

11. The apparatus according to claim 1
and further including
a plurality of angularly spaced housing fasteners, wherein each of the plurality of housing fasteners is operative to hold the outboard grease shield in fixed connection with the housing,
wherein each of the plurality of housing fasteners is disposed radially outward of the outboard bearing.

12. The apparatus according to claim 1 and further including
a plurality of angularly spaced housing fasteners, wherein each of the plurality of housing fasteners is operative to hold the outboard grease shield in fixed connection with the housing,
wherein each of the plurality of housing fasteners is disposed radially outward of the outboard bearing,
wherein the housing includes an axial housing recess, wherein the axial housing recess is bounded inwardly by an annular radially extending housing step,
wherein the outboard grease shield is in abutting fixed relation with the radially extending housing step.

13. The apparatus according to claim 1
wherein the inboard grease shield extends radially across at least a portion of each of the inboard thrust bearing inner race and the inboard thrust bearing outer race,
and wherein the outboard grease shield extends radially across at least a portion of each of the outboard bearing inner race and the outboard bearing outer race.

14. The apparatus according to claim 1
wherein the hub includes an annular axially extending hub projection, wherein the hub projection is axially disposed from the hub splined portion,
wherein the hub projection extends in the central plate opening.

15. The apparatus according to claim 1
and further including a plurality of angularly spaced axially extending compression springs,
wherein the springs extend axially intermediate of the pressure plate and the backplate and are operative to bias the pressure plate and the backplate axially apart.

16. The apparatus according to claim 1
wherein the housing includes
a pair of axially extending radially disposed annular housing outer wall surfaces,
wherein the piston includes
a pair of axially extending radially disposed annular piston inner wall surfaces,
wherein each piston inner wall surface is relatively axially movable in close-fitting relation with a respective housing outer wall surface, and wherein the chamber extends radially intermediate of the housing outer wall surfaces and the piston inner wall surfaces.

17. The apparatus according to claim 1
wherein the housing includes
a pair of axially extending radially disposed annular housing outer wall surfaces,
wherein the piston includes
a pair of axially extending radially disposed annular piston inner wall surfaces, wherein each piston inner wall surface is relatively axially movable in close-fitting relation with a respective housing outer wall surface, and wherein the chamber extends radially intermediate of the housing outer wall surfaces and the piston inner wall surfaces, a pair of annular resilient seals,
wherein one annular resilient seal sealingly extends between each respective housing outer wall surface and respective adjacent piston inner wall surface.

18. The apparatus according to claim 1
and further including a fluid pressure port extending in one of the housing or the piston,
wherein the fluid pressure port is fluidly connected with the chamber.

19. The apparatus according to claim 1
wherein the at least one friction disc includes a pair of friction discs,
and further comprising a separator disc, wherein the separator disc is positioned axially between the pair of friction discs,
wherein the separator disc includes a circular central splined separator disc opening, including a plurality of radially inwardly directed separator disc splines,
wherein the separator disc splines interengage and are axially movable in engaged relation with the radially outwardly extending hub splines of the hub splined portion.

20. The apparatus according to claim 1
wherein the at least one friction disc includes a pair of friction discs,
and further comprising a separator disc, wherein the separator disc is positioned axially between the pair of friction discs,
  wherein the separator disc includes a circular central splined separator disc opening, including a plurality of radially inwardly directed separator disc splines,
  wherein the separator disc splines interengage and are axially movable in engaged relation with the radially outwardly extending hub splines of the hub splined portion,
wherein the separator disc includes a pair of opposed axially extending annular projection portions,
  wherein each projection portion extends radially inward of and underlies at least a portion of the disc inner surface of a respective friction disc.

21. Apparatus comprising:
a fluid actuatable clutch including
  a cylindrical hub, wherein the hub includes
    an axially elongated hub opening configured to receive a shaft therein,
    an axially elongated hub splined portion, wherein the hub splined portion includes a plurality of radially outwardly directed, angularly spaced axially elongated hub splines,
  a circular backplate,
  wherein the backplate
    is in fixed operative connection with the hub,
    includes a circular central plate opening, wherein the central plate opening is configured to extend in surrounding relation to the shaft,
  a circular pressure plate,
    wherein the pressure plate includes
      a central circular splined plate opening, wherein the plate opening includes a plurality of angularly spaced radially inward directed plate splines, wherein the plurality of plate splines are in interengaged relation with the plurality of hub splines,
      and wherein the pressure plate is axially movable relative to the hub while the plate splines and the hub splines are in interengaged relation,
  at least one circular friction disc,
    wherein the at least one friction disc is axially intermediate of the backplate and the pressure plate,
    wherein each friction disc includes
      a circular inner disc opening bounded by an annular disc inner surface, wherein the hub extends in the disc opening and the disc inner surface is disposed radially outward from the hub such that the friction disc is rotatably movable independent of the hub,
      a splined outer disc surface, wherein the splined outer disc surface includes a plurality of angularly spaced radially outward directed disc splines,
      wherein the disc splines are configured to axially movably interengage a plurality of radially inward directed angularly spaced drive ring splines on an annular drive ring that extends in surrounding relation to each friction disc,
  an annular pressure sleeve,
  wherein the pressure sleeve
    extends in surrounding relation to the hub,
    includes an annular outer pressure sleeve surface,
    is axially movable in operative supported connection with the hub,
    is operatively engageable with the pressure plate such that axial movement of the pressure sleeve relative to the hub is operative to cause axial movement of the pressure plate relative to the hub,
  an annular clutch housing,
    wherein the annular clutch housing extends in surrounding relation to the hub,
  an annular clutch piston, wherein the clutch piston
    extends in surrounding relation to at least a portion of the housing and at least a portion of the pressure sleeve,
  wherein a variable volume annular chamber axially extends between the housing and the piston, wherein the piston is configured to be axially movable relative to the housing responsive to variation in volume of the chamber,
  an axially inboard thrust bearing,
  wherein the inboard thrust bearing
    includes a relatively rotatably movable thrust bearing inner race and a thrust bearing outer race, and
    extends radially between the pressure sleeve and the piston,
  an axially outboard bearing,
  wherein the outboard bearing
    includes a relatively rotatably movable outboard bearing inner race and an outboard bearing outer race, and
    extends radially between the hub and the housing,
  an annular inboard grease shield,
  wherein the inboard grease shield
    is in fixed operative connection with the piston,
    radially overlies at least a portion of the inboard thrust bearing, includes a circular inboard grease shield opening bounded radially inwardly by an annular inboard grease shield opening surface, wherein the inboard grease shield opening surface is in facing close-fitting adjacent relatively movable relation with the annular outer pressure sleeve surface, wherein a fixed annular inboard grease release gap extends between the inboard grease shield opening surface and the outer pressure sleeve surface.

22. The apparatus according to claim 21, and further comprising:

an annular outboard grease shield,
wherein the outboard grease shield
is in fixed operative connection with the housing,
radially overlies at least a portion of the outboard bearing,
includes a circular outboard grease shield opening bounded radially inwardly by an annular outboard grease shield opening surface,
an annular outer hub ring surface, wherein the outer hub ring surface is in fixed operative connection with the hub,
wherein the outboard grease shield opening surface is in facing close-fitting adjacent relatively movable relation with the outer hub ring surface, wherein a fixed annular outboard grease release gap extends between the outboard grease shield opening surface and the outer hub ring surface.

23. Apparatus comprising:
a fluid actuatable clutch including
a cylindrical hub,
wherein the hub includes
an axially elongated hub opening configured to receive a shaft therein,
an axially elongated hub splined portion, wherein the hub splined portion includes a plurality of radially outwardly directed, angularly spaced axially elongated hub splines,
a circular backplate,
wherein the backplate
is in fixed operative connection with the hub,
includes a circular central plate opening, wherein the central plate opening is configured to extend in surrounding relation to the shaft,
a circular pressure plate,
wherein the pressure plate includes
a central circular splined plate opening, wherein the plate opening includes a plurality of angularly spaced radially inward directed plate splines,
wherein the plurality of plate splines are in interengaged relation with the plurality of hub splines,
and wherein the pressure plate is axially movable relative to the hub while the plate splines and the hub splines are in interengaged relation,
at least one circular friction disc,
wherein the at least one friction disc is axially intermediate of the backplate and the pressure plate,
wherein each friction disc includes
a circular inner disc opening bounded by an annular disc inner surface, wherein the hub extends in the disc opening and the disc inner surface is disposed radially outward from the hub such that the friction disc is rotatably movable independent of the hub,
a splined outer disc surface, wherein the splined outer disc surface includes a plurality of angularly spaced radially outward directed disc splines,
wherein the disc splines are configured to axially movably interengage a plurality of radially inward directed angularly spaced drive ring splines on an annular drive ring that extends in surrounding relation to each friction disc,
an annular pressure sleeve,
wherein the pressure sleeve
extends in surrounding relation to the hub,
is axially movable in operative supported connection with the hub,
is operatively engageable with the pressure plate such that axial movement of the pressure sleeve relative to the hub is operative to cause axial movement of the pressure plate relative to the hub,
an annular clutch housing,
wherein the annular clutch housing extends in surrounding relation to the hub,
an annular clutch piston, wherein the clutch piston
extends in surrounding relation to at least a portion of the housing and at least a portion of the pressure sleeve,
wherein a variable volume annular chamber axially extends between the housing and the piston, wherein the piston is configured to be axially movable relative to the housing responsive to variation in volume of the chamber,
an axially inboard thrust bearing,
wherein the inboard thrust bearing
includes a relatively rotatably movable thrust bearing inner race and a thrust bearing outer race, and
extends radially between the pressure sleeve and the piston,
an axially outboard bearing,
wherein the outboard bearing
includes a relatively rotatably movable outboard bearing inner race and an outboard bearing outer race, and
extends radially between the hub and the housing,
an annular outboard grease shield,
wherein the outboard grease shield
is in fixed operative connection with the housing,
radially overlies at least a portion of the outboard bearing,
includes a circular outboard grease shield opening bounded radially inwardly by an annular outboard grease shield opening surface,
an annular outer hub ring surface, wherein the outer hub ring surface is in fixed operative connection with the hub,
wherein the outboard grease shield opening surface is in facing close-fitting adjacent relatively movable relation with the outer hub ring surface,
wherein a fixed annular outboard grease release gap extends between the outboard grease shield opening surface and the outer hub ring surface.

24. The apparatus according to claim 23,
wherein the pressure sleeve includes an annular outer pressure sleeve surface,
and further comprising:
an annular inboard grease shield, wherein the inboard grease shield
  is in fixed operative connection with the piston,
  radially overlies at least a portion of the inboard thrust bearing,
  includes a circular inboard grease shield opening bounded radially inwardly by an annular grease shield opening surface,
  wherein the inboard grease shield opening surface is in facing close-fitting adjacent relatively movable relation with the annular outer pressure sleeve surface,
  wherein a fixed annular inboard grease release gap extends between the inboard grease shield opening surface and the outer pressure sleeve surface.

* * * * *